US009414034B2

United States Patent
Saito

(10) Patent No.: US 9,414,034 B2
(45) Date of Patent: Aug. 9, 2016

(54) VIDEO PROJECTION SYSTEM INCLUDING MULTIPLE LOCAL VIDEO PROJECTION UNITS

(71) Applicant: STANLEY ELECTRIC CO., LTD., Meguro-ku, Tokyo (JP)

(72) Inventor: Takao Saito, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/886,799

(22) Filed: Oct. 19, 2015

(65) Prior Publication Data
US 2016/0119601 A1 Apr. 28, 2016

(30) Foreign Application Priority Data

Oct. 22, 2014 (JP) .................................. 2014-215748

(51) Int. Cl.
*H04N 9/31* (2006.01)
*H04N 5/74* (2006.01)

(52) U.S. Cl.
CPC .................................. *H04N 9/3185* (2013.01)

(58) Field of Classification Search
CPC . H04N 9/3185; H04N 9/3197; H04N 9/3147; H04N 9/28; H04N 9/31; H04N 5/74; G09G 2340/0407; G09G 2320/0233; G09G 2320/0276
USPC ......... 348/744, 745, 750, 790–792, 806–808; 345/7–9
IPC ............................................... H04N 9/31, 5/74
See application file for complete search history.

(56) References Cited

U.S. PATENT DOCUMENTS

| | | | |
|---|---|---|---|
| 3,915,548 A * | 10/1975 | Opittek ................. | G02B 27/01 345/7 |
| 8,730,549 B2 | 5/2014 | Aimono | |
| 2006/0028625 A1 | 2/2006 | Miyazawa | |
| 2007/0139449 A1* | 6/2007 | Bergquist ............ | G09G 3/3413 345/691 |
| 2008/0259223 A1* | 10/2008 | Read ................... | H04N 9/3147 348/745 |

(Continued)

FOREIGN PATENT DOCUMENTS

| JP | 3261701 B2 | 3/2002 |
|---|---|---|
| JP | 2004070257 A | 3/2004 |

(Continued)

OTHER PUBLICATIONS

Extended European Search Report dated Apr. 7, 2016, issued in counterpart European Application No. 15190947.0.

*Primary Examiner* — Sherrie Hsia
(74) *Attorney, Agent, or Firm* — Holtz, Holtz & Volek PC

(57) ABSTRACT

A video projection system includes: at least first and second local video projection units, and a video signal distributing unit adapted to distribute first and second luminance signals to the first and second local video projection units, respectively. The first local video projection unit projects a first view field along with a first maximum luminance of a first luminance distribution, and the second local video projection unit projects a second view field larger than the first view field along with a second maximum luminance of a second luminance distribution smaller than the first maximum luminance. A luminance resolution of the first luminance distribution is equal to a luminance resolution of the second luminance distribution.

4 Claims, 20 Drawing Sheets

(56) References Cited

U.S. PATENT DOCUMENTS

2010/0097393 A1    4/2010   Yoneno
2010/0315552 A1   12/2010   Rothaar et al.
2016/0019705 A1    1/2016   Kondo

FOREIGN PATENT DOCUMENTS

| | | |
|---|---|---|
| JP | 2012530264 A | 11/2012 |
| JP | 2014154046 A | 8/2014 |

* cited by examiner

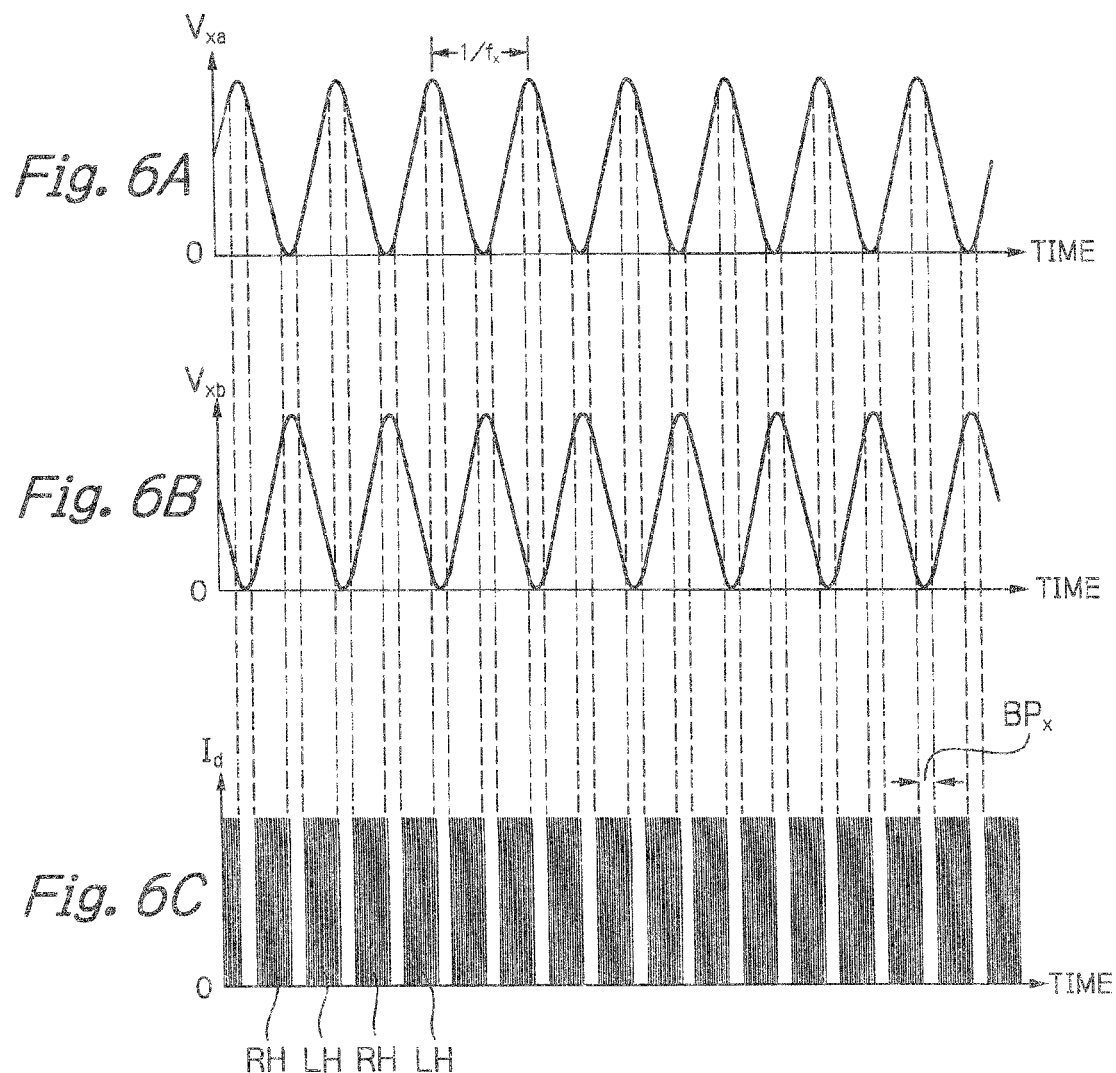

VIDEO PROJECTION SYSTEM INCLUDING MULTIPLE LOCAL VIDEO PROJECTION UNITS

This application claims the priority benefit under 35 U.S.C. §119 to Japanese Patent Application No. JP2014-215748 filed on Oct. 22, 2014, which disclosure is hereby incorporated in its entirety by reference.

BACKGROUND

1. Field

The presently disclosed subject matter relates to a video projection system including multiple local video projection units, used as a pico projector, a head mount display (HMD) unit or a head up display (HUD) unit.

2. Description of the Related Art

Recently, a video projection unit is constructed by a two-dimensional optical deflector as an optical scanner manufactured by a micro electro mechanical system (MEMS) device manufactured using a semiconductor process and micro machine technology (see: JP2012-530264A & US2010/0315552A1). Since the MEMS optical scanner is focus-free, the video projection unit can be small in size.

On the other hand, a video projection system combining multiple video projection units for depicting one display image has been developed. This video projection system can be used as a multi-monitor display system or a projection mapping system for depicting display images on an outside wall of a building or the like.

A prior art video projection system such as the above-mentioned video projection system is constructed by a whole video projection unit and a local, video projection unit to carry out superimposed video projections (see: JP2004-70257A). In this case, the luminance of the superimposed image is adjusted to make the luminance of the combined whole image uniform.

In the above-described prior art video projection system; however, the whole video projection unit and the local video projection unit are assumed to have the same performance with respect to the luminance and the luminance resolution. Therefore, the larger the maximum luminance, the larger the luminance resolution. As a result, when the maximum luminance and projected area of the whole video projection unit are different from those of the local video projection unit, it would be difficult to project a display image with a high contrast and a wide dynamic range.

SUMMARY

The presently disclosed subject matter seeks to solve the above-described problem.

According to the presently disclosed subject matter, a video projection system includes at least first and second local video projection units, and a video signal distributing unit adapted to distribute first and second luminance signals to the first and second local video projection units, respectively. The first local video projection unit projects a first view field along with a first maximum luminance, and the second local video projection unit projects a second view field larger than the first view field along with a second maximum luminance smaller than the first maximum luminance. A luminance resolution of the first luminance distribution is equal to a luminance resolution of the second luminance distribution.

The video signal distributing unit selects a first luminance distribution of the first luminance signal from an input luminance distribution. The first luminance distribution has luminances larger than the second maximum luminance and not larger than the first maximum luminance. The video signal distributing unit removes the first luminance distribution from the input luminance distribution, so that a first remaining luminance distribution remains in the input luminance distribution. The video signal distributing unit selects a second luminance distribution of the second luminance signal from the first remaining luminance distribution. The second luminance distribution has luminances larger than a third maximum luminance smaller than the second maximum luminance and not larger than the second maximum luminance. The video signal distributing unit removes the second luminance distribution from the first remaining luminance distribution, so that a second remaining luminance distribution remains in the input luminance distribution.

According to the presently disclosed subject matter, since the luminance resolutions are the same over the entire display image, the contrast can be high and the dynamic range can be widened.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIGS. 6A, 6B and 6C are timing diagrams for explaining the horizontal operation of the MEMS optical deflector of FIG. 4;

DETAILED DESCRIPTION OF EXEMPLARY EMBODIMENTS

Figure 1:
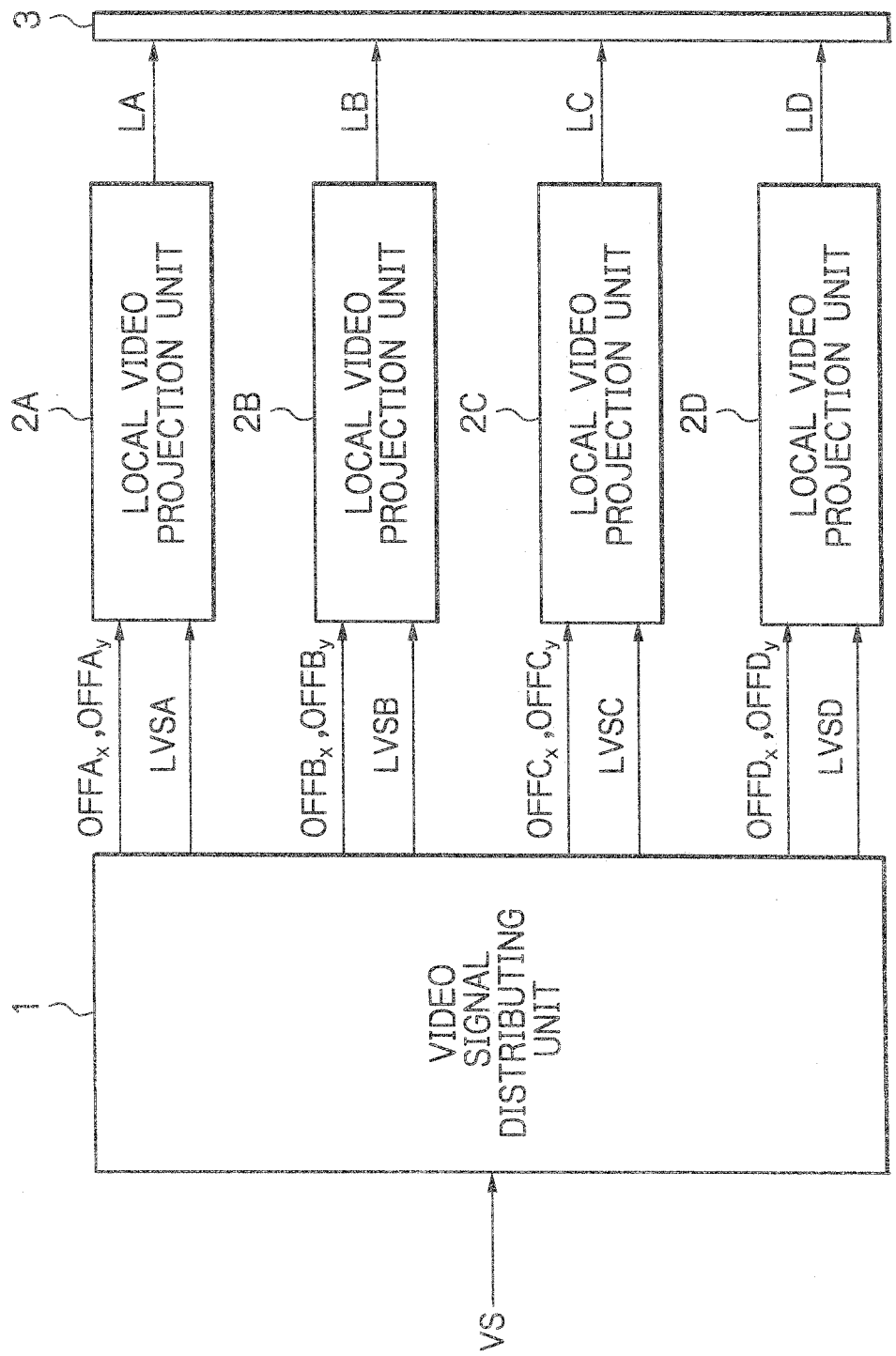
FIG. 1 is a block circuit diagram illustrating an embodiment of the video projection system according to the presently disclosed subject matter.

In FIG. 1, which illustrates an embodiment of the video projection system according to the presently disclosed subject matter, a video signal distributing unit 1 receives a video signal VS from a video source such as a personal computer or a camera system to distribute local video signals LVSA, LVSB, LVSC and LVSD along with offset signals $OFFA_x$, $OFFA_y$; $OFFB_x$, $OFFB_y$; $OFFC_x$, $OFFC_y$; and $OFFD_x$, $OFFD_y$ to local video projection units 2A, 2B, 2C and 2D each independently performing a raster scanning. Note that the number of local video projection units can be 2, 3, . . . other than 4.

The local video projection units 2A, 2B, 2C and 2D generate laser beams LA, LB, LC and LD for a screen 3 in accordance with the local video signals LVSA, LVSB, LVSC and LVSD. Also, the local video projection units 2A, 2B, 2C and 2D adjust the inclined directions of the MEMS optical deflectors thereof in accordance with the offset signals $OFFA_x$, $OFFA_y$; $OFFB_x$, $OFFB_y$; $OFFC_x$, $OFFC_y$; and $OFFD_x$, $OFFD_y$. The MEMS optical deflectors will be explained later in more detail.

Figure 2:
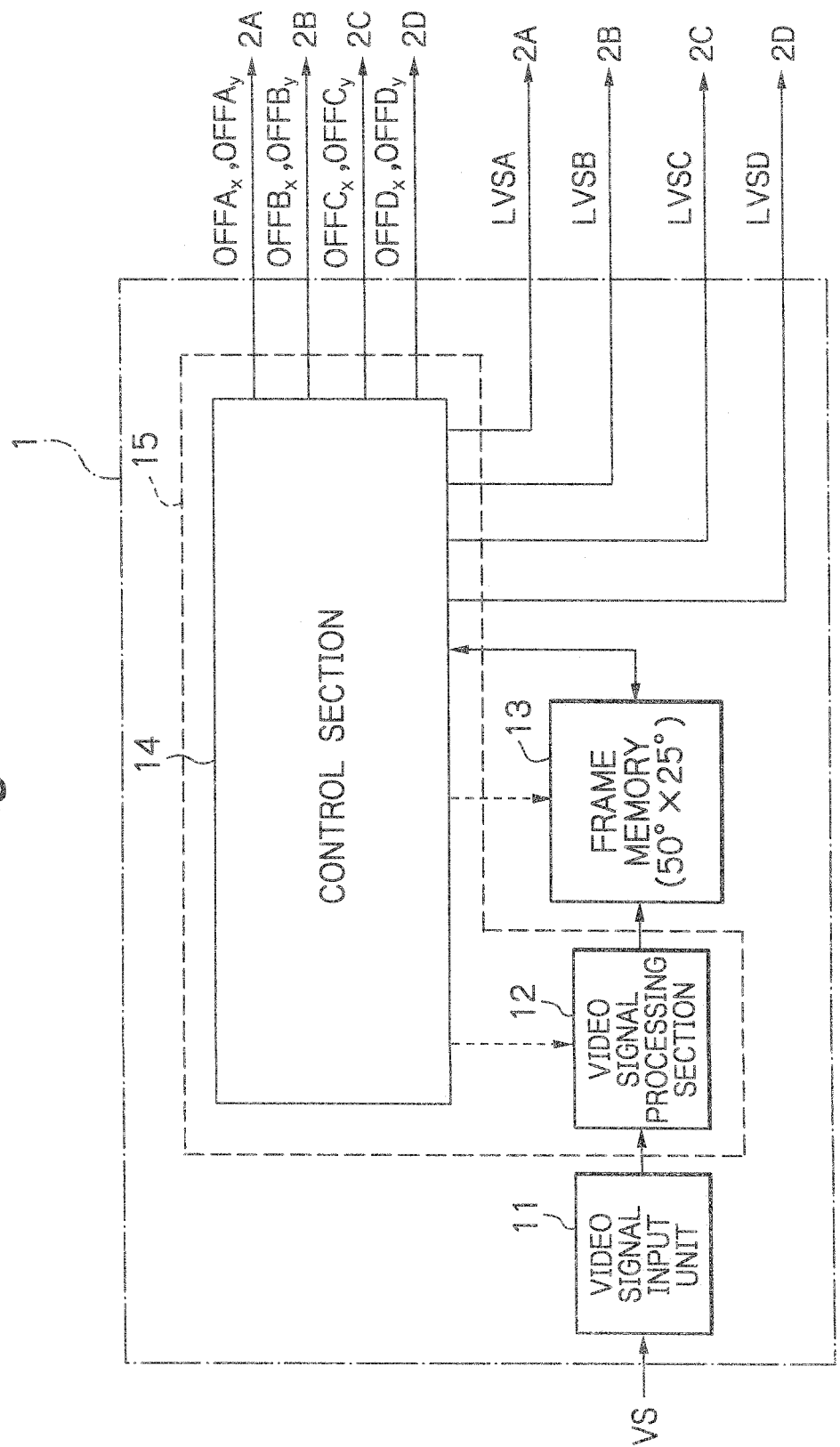
FIG. 2 is a detailed block circuit diagram of the video signal distributing unit of FIG. 1.

In FIG. 2, which is a detailed block circuit diagram of the video signal distributing unit 1 of FIG. 1, the video signal distributing unit 1 is constructed by a video signal input unit 11, a video signal processing section 12, a frame memory 13 and a control section 14 for generating the local video signals LVSA, LVSB, LVSC and LVSD and transmitting them to the local video projection units 2A, 2B, 2C and 2D. The video signal processing section 12 and the frame memory 13 are controlled by the control section 14.

The video signal input unit 11 is an analog red/green/blue (RGB) receiver or a digital video signal receiver such as a digital video interactive (DVI), or a high-definition multimedia interface (HDMI) Video signals received by the video signal input unit 11 are processed by a video signal processing section 12 and are stored in the frame memory 13 frame by frame. For example, 60 frames per second are stored in the frame memory 13. The frame memory 13 is formed by a high speed random access memory (RAM) such as an SDRAM, a DDR2 SDRAM or an DDR3 SDRAM. In this case, one frame of the frame memory 13 corresponds to a view field formed by a horizontal angle of 50° and a vertical angle of 25°.

Also, the control section 14 generates the offset signals $OFFA_x$, $OFFA_y$; $OFFB_x$, $OFFB_y$; $OFFC_x$, $OFFC_y$; and $OFFD_x$, $OFFD_y$ and transmits them to the local video projection units 2A, 2B, 2C and 2D.

In FIG. 2, the video signal processing section 12 and the control section 14 can be formed by a single microcomputer 15 using a field-programmable gate array (FPGA), an extensible processing platform (EPP) or a system-on-a-chip (SoC). The control section 14 has an interface function with a universal asynchronous receiver transmitter (UART) and the like.

Figure 3:
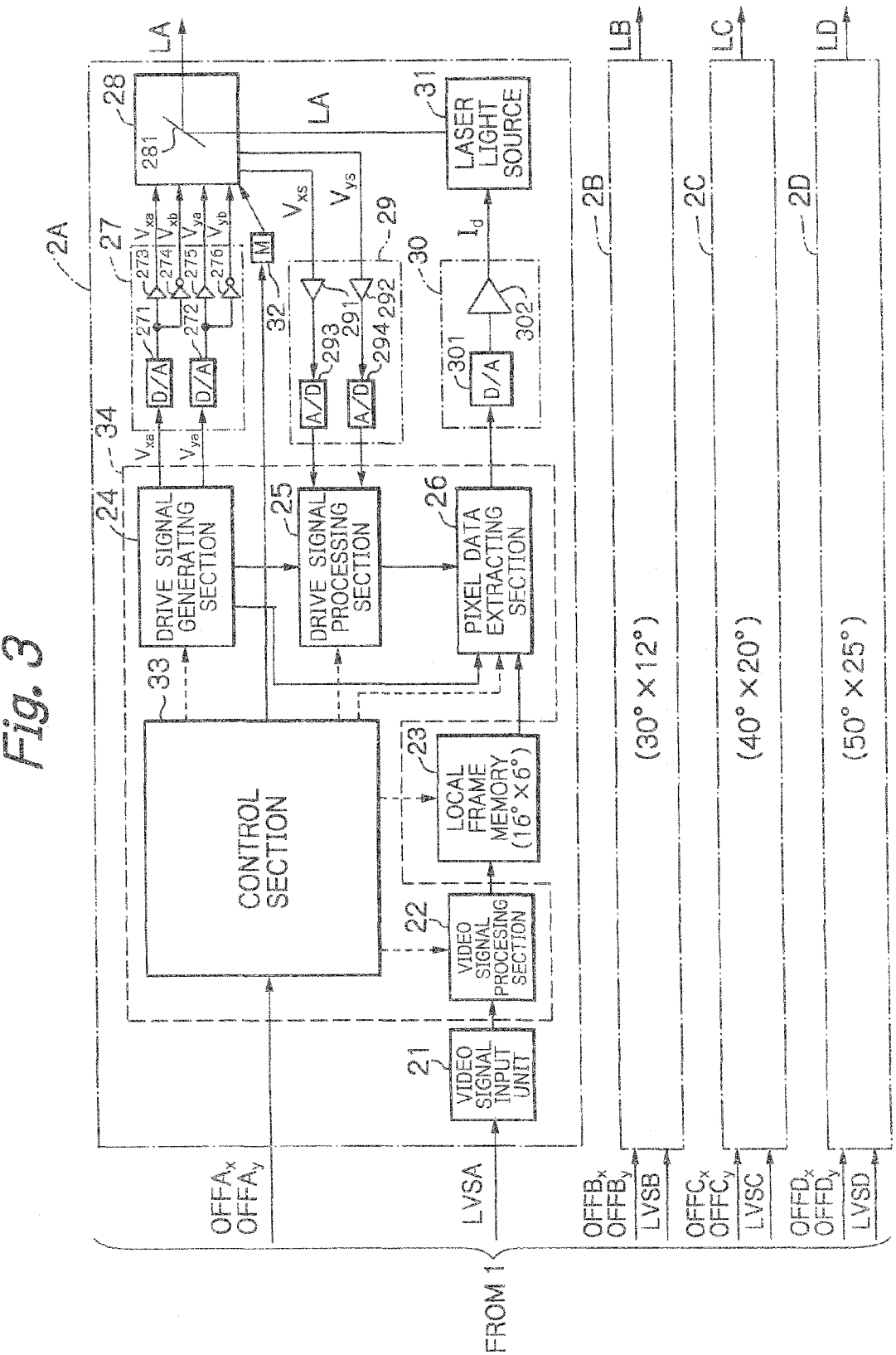
FIG. 3 is a detailed block circuit diagram of the local video projection unit of FIG. 1.

In FIG. 3, which is a detailed block circuit diagram of the local video projection unit 2A of FIG. 1, the local video projection unit 2A is constructed by a video signal input unit 21 similar to the video signal input unit 11 of FIG. 2, a video signal input processing section 22 similar to the video signal processing section 12 of FIG. 2 and a local frame memory 23 similar to the frame memory 13 of FIG. 2. In this case, the local frame memory 23 is used for projecting a view field formed by a horizontal angle of 16° and a vertical angle of 6°.

Also, the local video projection unit 2A is constructed by a drive signal generating section 24, a drive signal processing section 25, and a pixel data extracting section 26. The drive signal generating section 24 generates drive voltages $V_{xa}$ and $V_{ya}$ which are transmitted via a drive unit 27 formed by digital-to-analog (D/A) converters 271 and 272, amplifiers 273 and 274, and inverters 275 and 276 to a MEMS optical deflector 28. In this case, the drive voltages $V_{xa}$ and $V_{ya}$ and their inverted drive voltages $V_{xb}$ and $V_{yb}$ are supplied to the MEMS optical deflector 28. On the other hand, the MEMS optical deflector 28 generates sense voltages $V_{xs}$ and $V_{ys}$ in response to the flexing angle of the mirror thereof which are supplied via a sense signal input unit 29 formed by amplifiers 291 and 292 and analog-to-digital (A/D) converters 293 and 294 to the drive signal processing section 25. The pixel data extracting section 26 generates a drive signal which is supplied to a light source drive unit 30 formed by a D/A converter 301 and an amplifier 302 for supplying a drive current $I_d$ to a laser light source 31. Note that the light source drive unit 30 and the laser light source 31 can be provided for each of red (R), green (G) and blue (B).

Further, the local video projection unit 2A is constructed by stepping motor units 32 for declining the MEMS optical deflector 28 in accordance with the offset signals $OFFA_x$ and $OFFA_y$.

The video signal input processing section 22, the local frame memory 23, the drive signal generating section 24, the drive signal processing section 25 and the pixel data extracting section 26 are controlled by a control section 33.

In more detail, the drive signal generating section 24 transmits extracting timing signals of pixel data to the pixel data extracting section 26. Also, the drive signal processing section 25 receives drive signals similar to the drive voltages $V_{xa}$ and $V_{ya}$ from the drive signal generating section 24 and the sense voltages $V_{xs}$ and $V_{ys}$ from the sense signal input unit 29 to transmit a delay timing signal to the pixel data extracting section 26 due to the delay of transmission of the drive voltages $V_{xa}$ and $V_{ya}$ to the mirror 281 of the MEMS optical deflector 28. Further, the pixel data extracting section 26 extracts pixel data from the local frame memory 23 in accordance with the extracting timing signals of the drive signal generating section 24 and the delay signal of the drive signal processing section 25.

In FIG. 3, the video signal processing section 22, the drive signal generating section 24, the drive signal processing section 25, the pixel data extracting section 26 and the control section 33 can be formed by a single microcomputer 34 using a field-programmable gate array (FPGA), an extensible processing platform (EPP) or a system-on-a-chip (SoC). The control section 33 has an interface function with an universal aysnchronous receiver transmitter (UART) and the like.

The local video projection units 2B, 2C and 2D have the same configuration except that each local frame memory 23 of the units 2B, 2C and 2D is used for projecting a view field formed by a horizontal angle of 30° and a vertical angle of 12°, a view field formed by a horizontal angle of 40° and a vertical angle of 20°, and a view field formed by a horizontal angle of 50° and a vertical angle of 25°, respectively.

Figure 4:
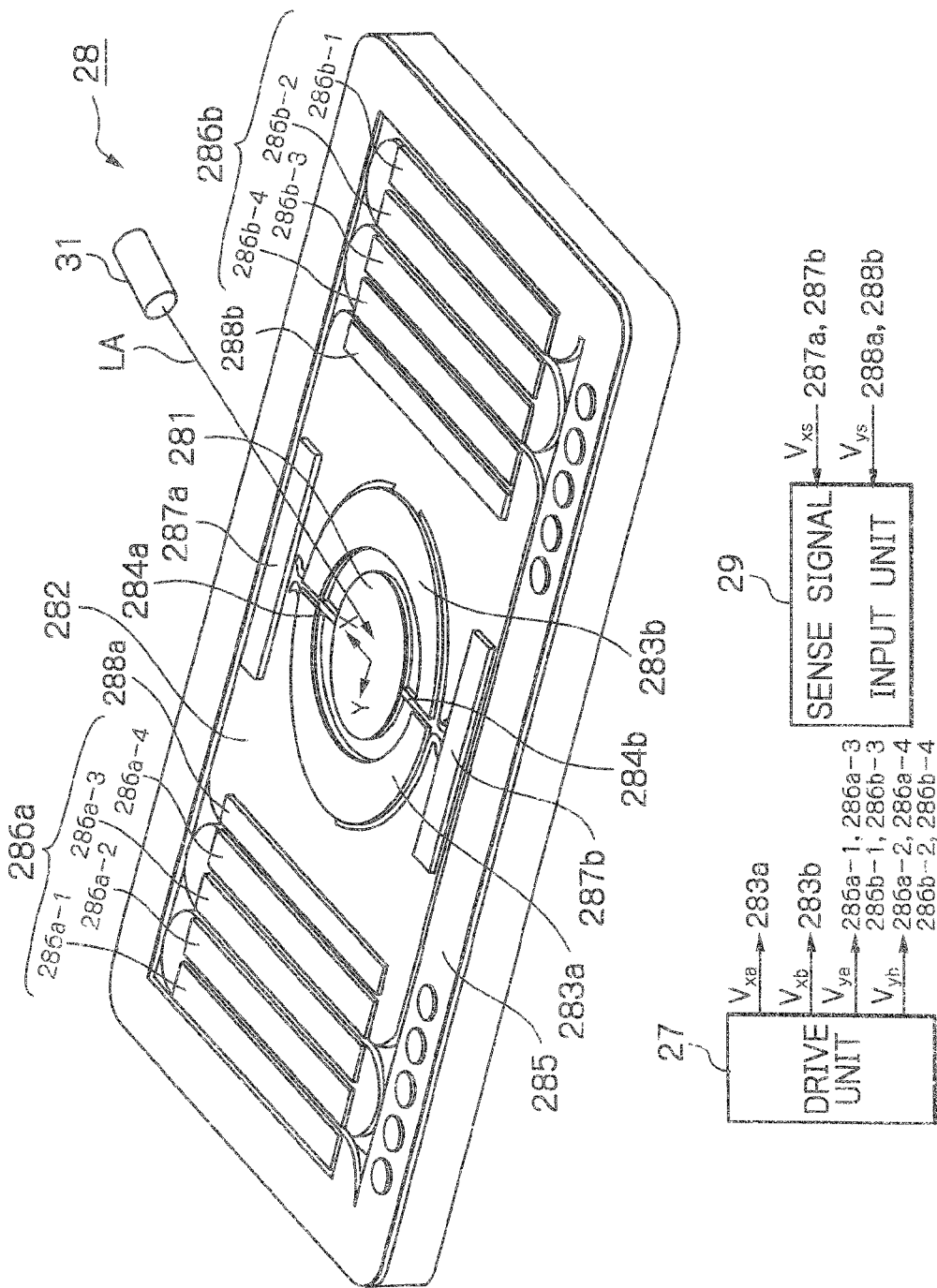
FIG. 4 is a perspective view of the MEMS optical deflector of FIG. 3.
Figure 9:
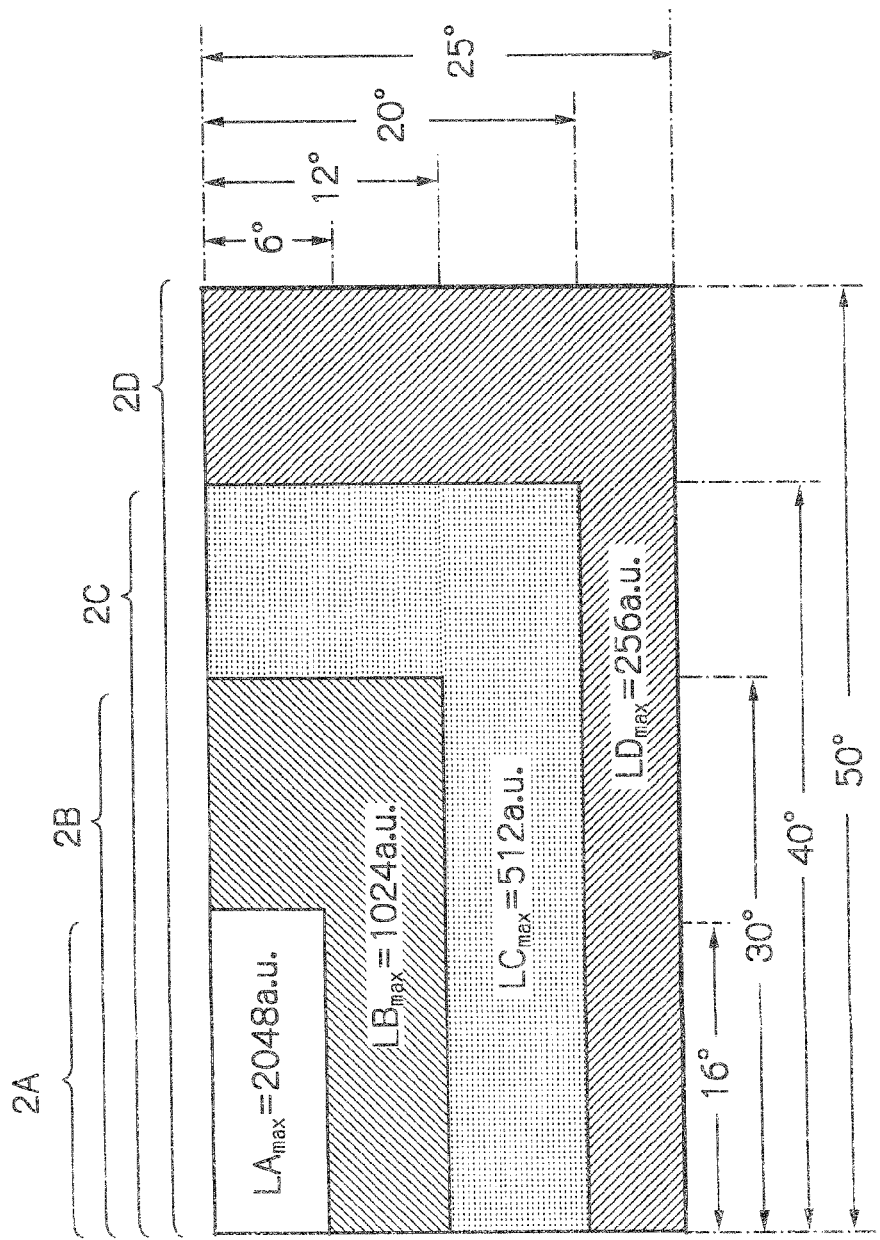
FIG. 9 is a diagram showing view fields to be projected of the local video projection units of FIG. 3.

In FIG. 4, which is a perspective view of the MEMS optical deflector 28 of FIG. 3, the MEMS optical deflector 28 is constructed by a circular mirror 281 for reflecting incident light LA from the laser light source 31, an inner frame (movable frame) 282 surrounding the mirror 281 for supporting the mirror 281, a pair of torsion bars 284a and 284b coupled between the mirror 281 and the inner frame 282, a pair of inner piezoelectric actuators 283a and 283b coupled between the inner frame 282 and the mirror 281 and serving as cantilevers for rocking the mirror 281 with respect to an X-axis of the mirror 281, an outer frame (support frame) 285 surrounding the inner frame 282, a pair of meander-type outer piezoelectric actuators 286a and 286b coupled between the outer frame 285 and the inner frame 282 and serving as cantilevers for rocking the mirror 281 through the inner frame 282 with respect to a Y-axis of the mirror 281 perpendicular to the X-axis, piezoelectric sensors 287a and 287b on the inner frame 282 in the proximity of the inner piezoelectric actuators 283a and 283b, and piezoelectric sensors 288a and 288b on the inner frame 282 in the proximity of the outer piezoelectric actuators 286a and 286b (see: FIG. 9 of U.S. Pat. No. 8,730, 549B2).

The inner frame 282 is rectangularly-framed to surround the mirror 281 associated with the inner piezoelectric actuators 283a and 283b.

The torsion bars 284a and 284b are arranged along the X-axis, and have ends coupled to the inner circumference of the inner frame 282 and other ends coupled to the outer circumference of the mirror 281. Therefore, the torsion bars 284a and 284b are twisted by the inner piezoelectric actuators 283a and 283b to rock the mirror 281 with respect to the X-axis.

The inner piezoelectric actuators 283a and 283b oppose each other along the Y-axis and sandwich the torsion bars 284a and 284b. The inner piezoelectric actuators 283a and 283b have ends coupled to the inner circumference of the inner frame 282 and other ends coupled to the torsion bars 284a and 284b. In this case, the flexing direction of the inner piezoelectric actuator 283a is opposite to that of the inner piezoelectric actuator 283b.

The outer frame 285 is rectangularly-framed to surround the inner frame 282 via the outer piezoelectric actuators 286a and 286b.

The outer piezoelectric actuators 286a and 286b are coupled between the inner circumference of the outer frame 285 and the outer circumference of the inner frame 282, in order to rock the inner frame 282 associated with the mirror 281 with respect to the outer frame 285, i.e., to rock the mirror 281 with respect to the Y-axis.

The outer piezoelectric actuator 286a is constructed by piezoelectric cantilevers 286a-1, 286a-2, 286a-3 and 286a-4 which are serially-coupled from the outer frame 285 to the inner frame 282. Also, each of the piezoelectric cantilevers 286a-1, 286a-2, 286a-3 and 286a-4 are in parallel with the X-axis of the mirror 281. Therefore, the piezoelectric cantilevers 286a-1, 286a-2, 286a-3 and 286a-4 are folded at every cantilever or meandering from the outer frame 285 to the inner frame 282, so that the amplitudes of the piezoelectric cantilevers 286a-1, 286a-2, 286a-3 and 286a-4 can be changed along directions perpendicular to the Y-axis of the mirror 281.

Similarly, the outer piezoelectric actuator 286b is constructed by piezoelectric cantilevers 286b-1, 286b-2, 286b-3 and 286b-4 which are serially-coupled from the outer frame 285 to the inner frame 282. Also, each of the piezoelectric cantilevers 286b-1, 286b-2, 286b-3 and 286b-4 are in parallel with the X-axis of the mirror 281. Therefore, the piezoelectric cantilevers 286b-1, 286b-2, 286b-3 and 286b-4 are folded at every cantilever or meandering from the outer frame 285 to the inner frame 282, so that the amplitudes of the piezoelectric, cantilevers 286b-1, 286b-2, 286b-3 and 286b-4 can be changed along directions perpendicular to the Y-axis of the mirror 281.

Note that the number of piezoelectric cantilevers in the outer piezoelectric actuator 286a and the number of piezoelectric cantilevers in the outer piezoelectric actuator 286b can be other values such as 2, 6, 8, . . . .

The piezoelectric sensors 287a and 287b serving as speed sensors that sense deflection angle deviations of the mirror 281 mainly caused by the inner piezoelectric actuators 283a and 283b. Note that the output signals of the piezoelectric sensors 287a and 287b are substantially the same as each other, and therefore, these output signals are combined and represented by the sense angle voltage $V_{xs}$ corresponding to a differentiated signal of the drive voltage $V_{xa}$ or $V_{xb}$. One of the piezoelectric sensors 287a and 287b can be omitted.

The piezoelectric sensors 288a and 288b serving as speed sensors that sense deflection angle signals of the mirror 281 mainly caused by the outer piezoelectric actuators 286a and 286b. Note that the output signals of the piezoelectric sensors 286a and 286b are substantially the same as each other, and therefore, these output signals are combined and represented by the sense angle voltage $V_{ys}$ corresponding to a differentiated signal of the drive voltage $V_{ya}$ or $V_{yb}$. One of the piezoelectric sensors 288a and 288b can be omitted.

The structure of each element of the MEMS optical deflector 28 is explained below.

The mirror 281 is constructed by a monocrystalline silicon support layer serving as a vibration plate and a metal layer serving as a reflector.

The inner frame 282, the torsion bars 284a and 284b and the outer frame 285 are constructed by the monocrystalline silicon support layer and the like.

Each of the piezoelectric actuators 284a and 284b and the piezoelectric cantilevers 286a-1 to 286a-4 and 286b-1 to 286b-4 and the piezoelectric sensors 287a, 287b, 287a and 287b is constructed by a Pt lower electrode layer, a lead titanate zirconate (PZT) layer and a Pt upper electrode layer.

The meander-type piezoelectric actuators 286a and 286b are described below.

In the piezoelectric actuators 286a and 286b, the piezoelectric cantilevers 286a-1, 286a-2, 286a-3, 286a-4, 286b-1, 286b-2, 286b-3 and 286b-4 are divided into an odd-numbered group of the piezoelectric cantilevers 286a-1 and 286a-3; 286b-1 and 286b-3, and an even-numbered group of the piezoelectric cantilevers 286a-2 and 286a-4; 286b-2 and 286b-4 alternating with the odd-numbered group of the piezoelectric cantilevers 286a-1 and 286a-3; 286b-1 and 286b-3.

Figure 5A:
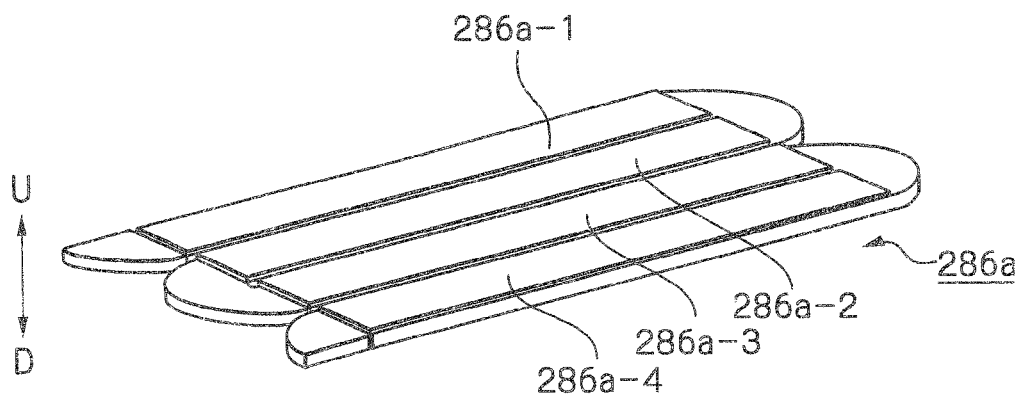
FIGS. 5A and 5B are perspective views for explaining the operation of the outer piezoelectric actuator of FIG. 4.
Figure 5B:
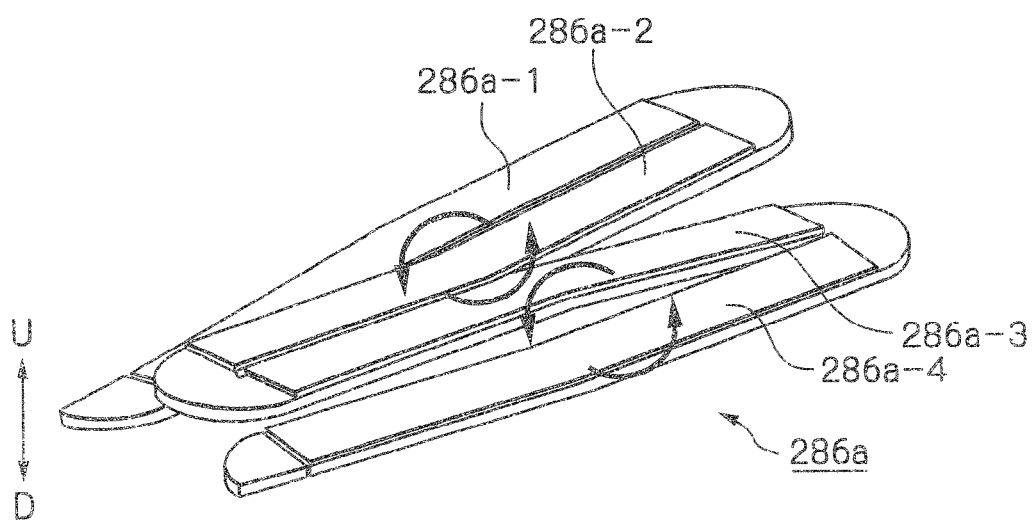

FIGS. 5A and 5B are perspective views for explaining the operation of the piezoelectric cantilevers of one outer piezoelectric actuator such as 286a of FIG. 4. Note that FIG. 5A illustrates a non-operation state of the piezoelectric cantilevers 286a-1, 286a-2, 286a-3 and 286a-4 of the piezoelectric actuator 286a, and FIG. 4B illustrates an operation state of the piezoelectric cantilevers 286a-1, 286a-2, 286a-3 and 286a-4 of the outer piezoelectric actuator 286a.

For example, as illustrated in FIG. 5B which illustrates only the piezoelectric cantilevers 286a-1, 286a-2, 286a-3 and 286a-4, when the odd-numbered group of the piezoelectric cantilevers 286a-1, 286a-3, 286b-1 and 286b-3 are flexed in one direction, for example, in a downward direction D, the even-numbered group of the piezoelectric cantilevers 286a-2, 286a-4, 286b-2 and 286b-4 are flexed in the other direction, i.e., in an upward direction U. On the other hand, when the odd-numbered group of the piezoelectric cantilevers 286a-1, 286a-3, 286b-1 and 286b-3 are flexed in the upward direction, the even-numbered group of the piezoelectric cantilevers 286a-2, 286a-4, 286b-2 and 286b-4 are flexed in the downward direction D.

Thus, the mirror 281 is rocked with respect to the Y-axis.

First, a main scanning operation or horizontal scanning operation by rocking the mirror 281 with respect to the X-axis is explained in detail with reference to FIGS. 6A, 6B and 6C.

As illustrated in FIGS. 6A and 6B, the drive voltage $V_{xa}$ and the drive voltage $V_{xb}$ generated from the drive unit 27 are sinusoidal at a relatively high resonant frequency $f_x$ and symmetrical or opposite in phase to each other. As a result, the inner piezoelectric actuators 283*a* and 283*b* carry out flexing operations in opposite directions to each other, so that the torsion bars 284*a* and 284*b* are twisted to rock the mirror 281 with respect to the X-axis.

In this case, the changing rates of the drive voltages $V_{xa}$ and $X_{xb}$ are low at their lowest and highest levels as illustrated in FIGS. 6A and 6B, so that the brightness thereof at the screen 3 would be particularly high. Therefore, as illustrated in FIG. 6C, horizontal blanking periods $BP_X$ for turning off the laser light source 31 are provided where the changing rates of the drive voltages $V_{xa}$ and $X_{xb}$ are low to make the brightness at the entire screen 3 uniform. Additionally, right-direction horizontal scanning periods RH alternating with left-direction horizontal scanning periods LH are provided between the horizontal blanking periods $BP_x$, in order to increase the depicting time period, thus increasing the depicting efficiency.

Next, a sub scanning operation or vertical scanning operation by rocking the mirror 281 with respect to the Y-axis is explained in detail with reference to FIGS. 7A, 7B and 7C.

Figure 7A:
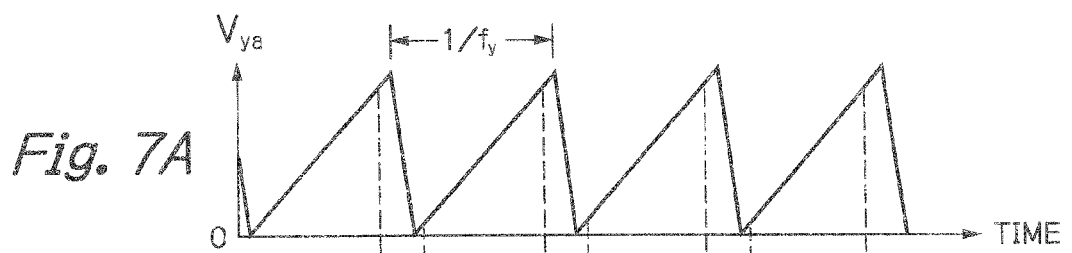
FIGS. 7A, 7B and 7C are timing diagrams for explaining the vertical operation of the MEMS optical deflector of FIG. 4.
Figure 7B:
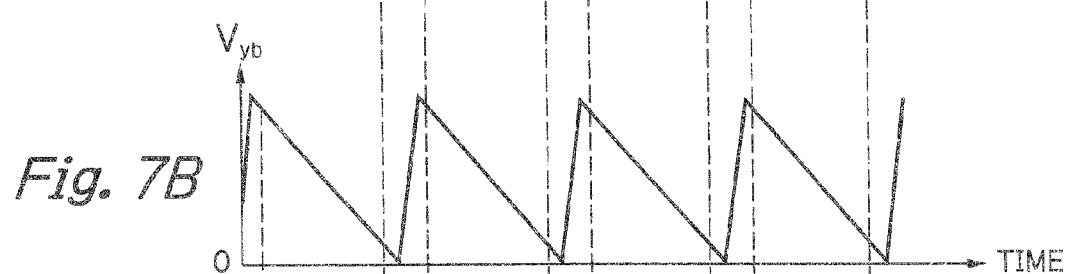
Figure 7C:
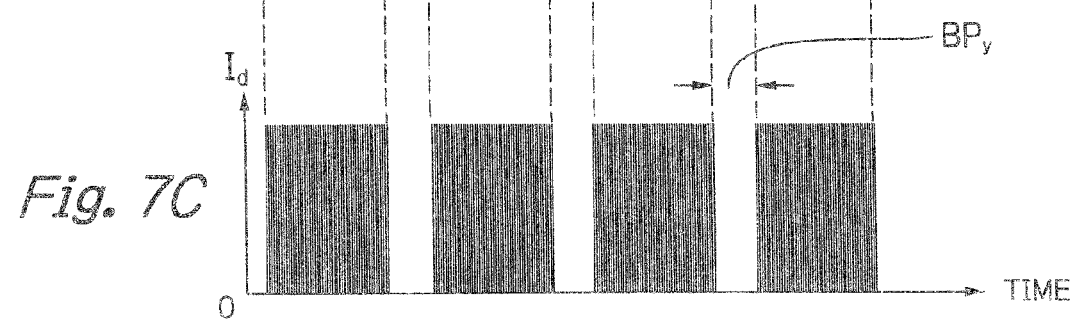

As illustrated in FIGS. 7A and 7B, the drive voltage $V_{ya}$ the drive voltage $V_{yb}$ are saw-tooth-shaped at a relatively low non-resonant frequency $f_Y$ and symmetrical or opposite in phase to each other. As a result, the piezoelectric cantilevers 286*a*-1, 286*a*-3, 286*b*-1 and 286*b*-3 and the piezoelectric cantilevers 286*a*-2, 286*a*-4, 286*b*-2 and 286*b*-4 carry out flexing operations in opposite directions to each other, so that the mirror 281 is rocked with respect to the Y-axis.

In this case, since the changing rates of the drive voltages $V_{ya}$ and $V_{yb}$ are low at their lowest and highest levels as illustrated in FIGS. 7A and 7B, so that the brightness thereof at the screen 3 would be particularly high. Therefore, as illustrated in FIG. 7C, vertical blanking periods $BP_Y$ for turning off the laser light source 31 are provided where the changing rates of the drive voltages $V_{ya}$ and $V_{yb}$ are low to make the brightness at the entire screen 3 uniform.

Figure 8:
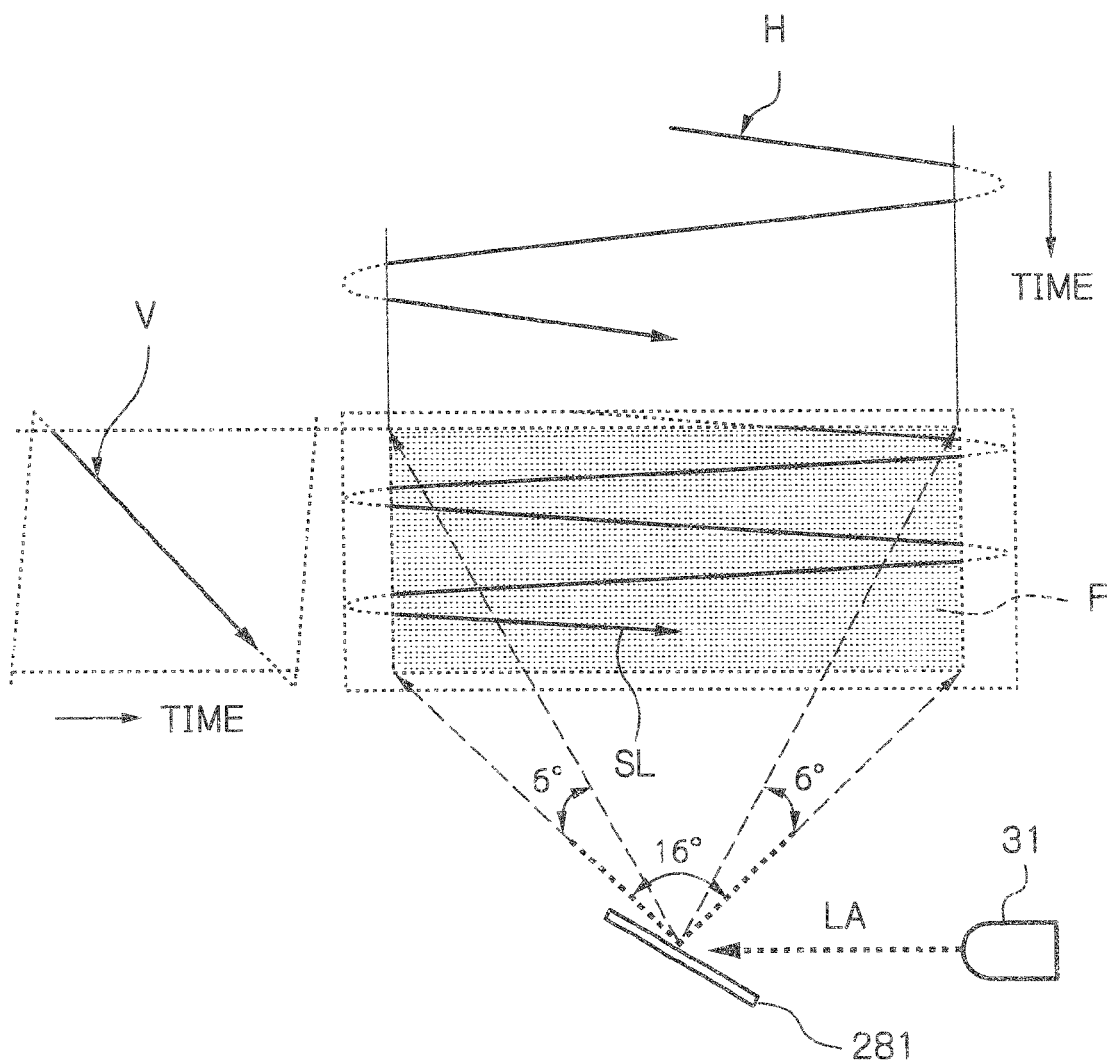
FIG. 8 is a diagram showing the relationship between a scanning locus of the MEMS optical deflector and a projected view field of the laser beam of the laser light source of FIG. 3.

As illustrated in FIG. 8, which is a diagram illustrating a relationship between a scanning locus SL of the MEMS optical deflector 28 and a projected area of the laser beam LA of the laser light source 31 of FIG. 3, a horizontal scanning line U and a vertical scanning line V by the MEMS optical deflector 24 are protruded from a projected view field F of the laser beam LA.

Initially, as illustrated in FIG. 9, the local video projection unit 2A has a predetermined view field to be projected by a horizontal angle of 16° and a vertical angle of 6° with a maximum luminance $LA_{max}$=2048 a.u.; the local video projection unit 2B has a predetermined view field to be projected by a horizontal angle of 30° and a vertical angle of 12° with a maximum luminance $LB_{max}$=1024 a.u.; the local video projection unit 2C has a predetermined view field to be projected by a horizontal angle of 40° and a vertical angle of 20° with a maximum luminance $LC_{max}$=a.u.; and the local video projection unit 2D has a predetermined view field to be projected by a horizontal angle of 50° and a vertical angle of 25° with a maximum luminance $LD_{max}$=256 a.u. That is, the larger the maximum luminance, the smaller the view field to be projected. Also, the priority sequence is the local video projection unit 2A→the local video projection unit 2B→the local video projection unit 2C→the local video projection unit 2D in accordance with the magnitudes of the projected view fields.

The operation of the control section 13 of the video signal distributing unit 1 of FIG. 2 is explained next with reference to FIG. 10.

Note that the pixel pitches of the local video projection units 2A, 2B, 2C and 2D are preferably the same, i.e., the pixel resolutions thereof are preferably the same; however, if the pixel resolutions of the local video projection units 2A, 2B, 2C and 2D are different from each other, a scaling of the pixel resolutions between the local video projection units 2A, 2B, 2C and 2D is carried out, so that the pixel resolutions of the local video projection units 2A, 2B, 2C and 2D are the same.

Figure 11:
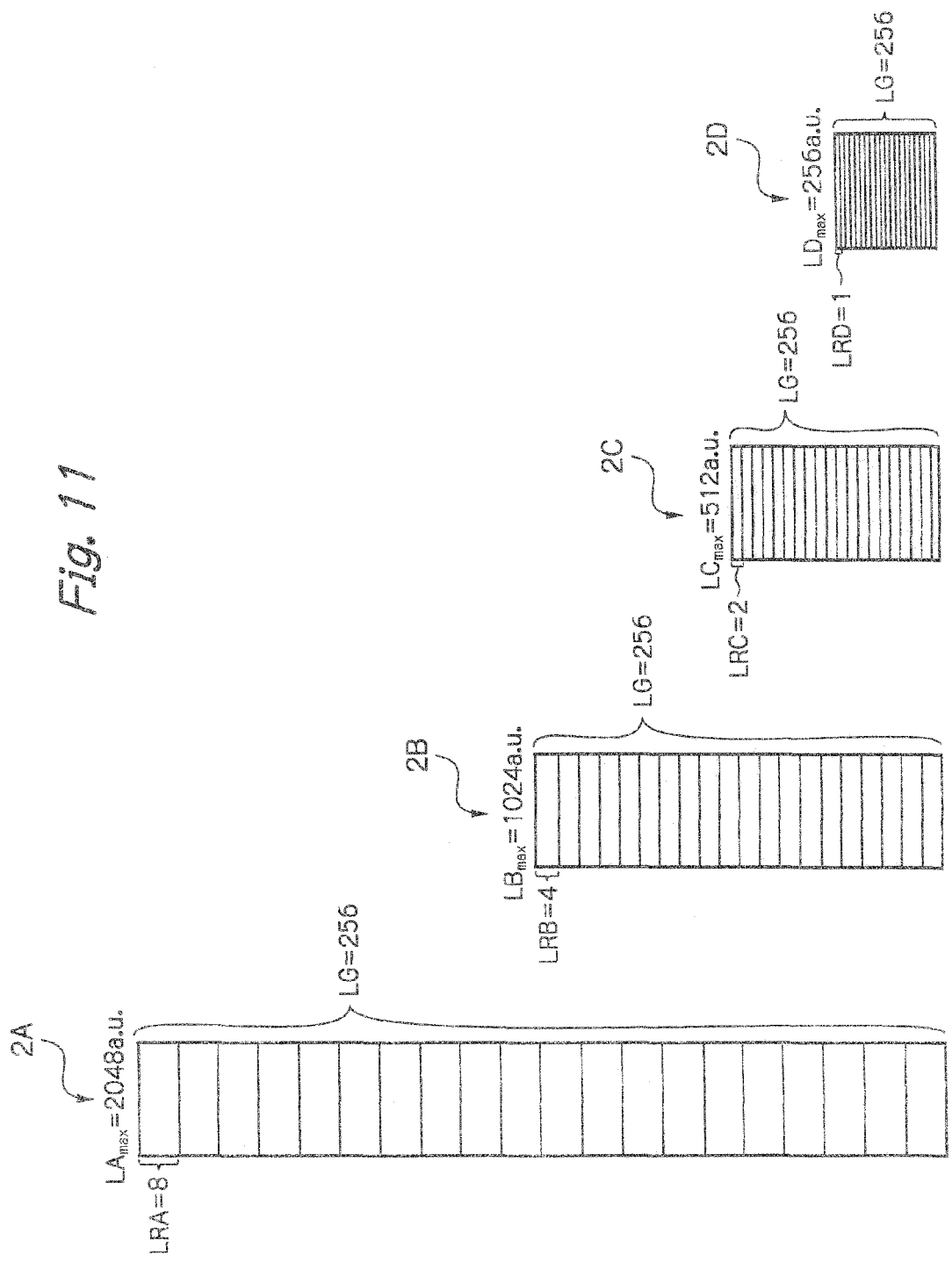
FIG. 11 is a diagram illustrating for explaining initial luminance gradations of the local video projection units of FIG. 3.

First, referring to step 1001, the control section 14 calculates a least common multiple LCM of the luminance resolutions LRA, LRB, LRC and LRD of the local video projection units 2A, 2B, 2C and 2D which are generally different from each other. In this case, it is assumed that the luminance resolutions LRA, LRB, LRC and LRD are represented by positive integers (a.u.). For example, as illustrated in FIG. 11, if the luminance gradations LG of the local video projection unit 2A, 2B, 2C and 25 are the same, i. e., 256, their luminance resolutions LRA, LRB, LRC and LRD of the local video projection units 2A, 2B, 2C and 2D are LRA=8 (a.u.)
LRB=4 (a.u.)
LRC=2 (a.u.)
LRD=1 (a.u.)

In this case, the least common multiple LCM of the luminance resolutions LRA, LRB, LRC and LRD is:

LCM=8

Next, referring to step 1002, the control section 14 calculates a luminance gradation LG' commonly for all the local video projection unit 2A, 2B, 2C and 2D by $$LG' = LG \times LCM$$
$$= 256 \times 8$$
$$= 2048$$

Figure 12:
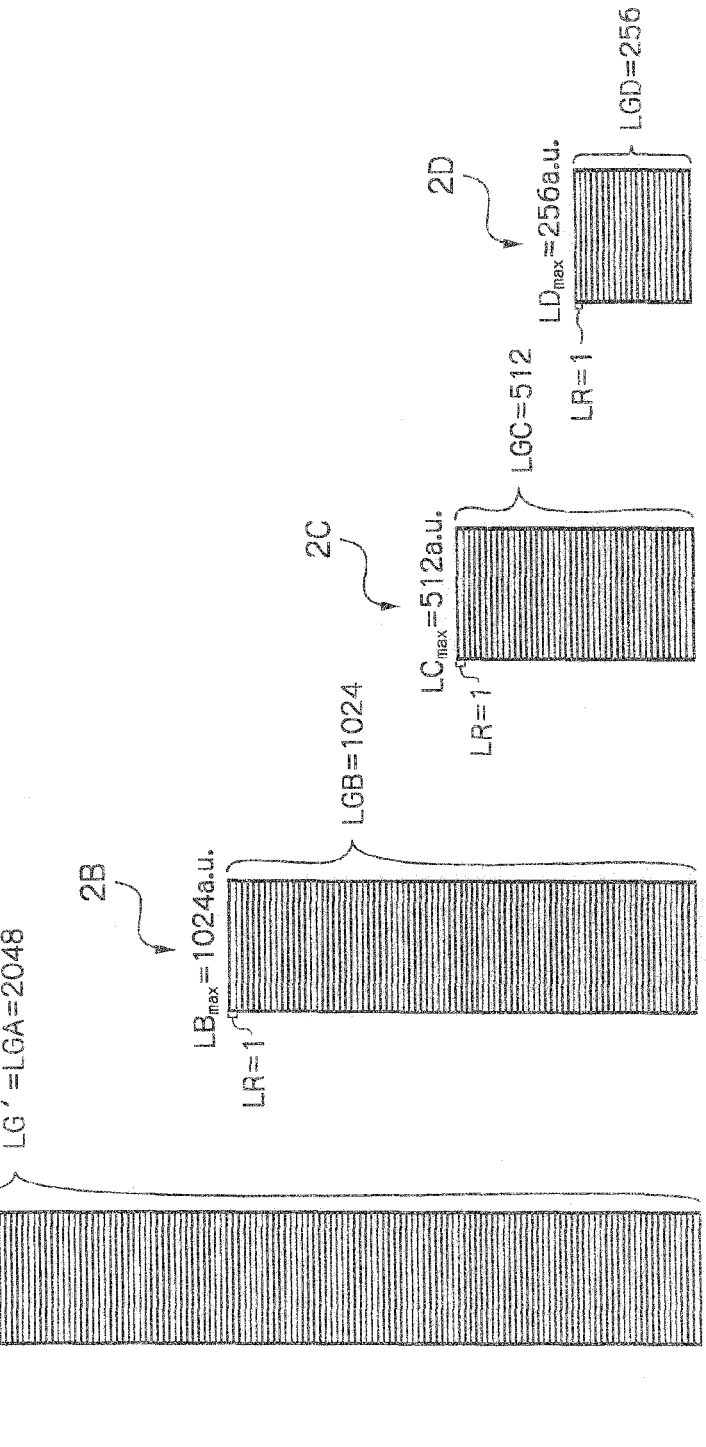
FIG. 12 is a diagram illustrating for explaining luminance gradations of the local video projection units of FIG. 3, obtained at step 1002 of FIG. 10.

In this case, as illustrated in FIG. 12, the luminance gradations LGA, LGB, LGC and LGD of the local video projection unit 2A, 2B, 2C and 2D are

LGA=LG'×8/LCM=2048
LGB=LG'×4/LCM=1024
LGC=LG'×2/LCM=512
LGD=LG'×1/LCM=256

As a result, the luminance resolution LR of all the local video projection units 2A, 2B, 2C and 2D is:

LR=1

Thus, the luminance resolutions of the local video projection units 2A, 2B, 2C and 2D are the same.

Next, referring to step 1003, it is determined whether or not the luminance gradation ILG of an input video signal coincides with the calculated luminance gradation LG' (=2048). Note that the luminance gradation ILG of the input video signal is determined in advance with the video source and is stored in the control section 14 along with the resolution and luminance information of the local video projection units 2A, 2B, 2C and 2D. Only when the luminance gradation ILG of the input video signal coincides with the calculated luminance gradation LG', does the control proceed to step 1005. Otherwise, the control proceeds to step 1004 which performs a scaling process upon the luminance gradation ILG of the input video signal. In this scaling process, if the luminance gradation ILG of the input video signal is 1024, then the luminance gradation ILG is doubled, and if the luminance gradation ILG of the input video signal is 4096, then the luminance gradation ILG is halved. Then, the control proceeds to step 1005.

Referring to step 1005, the control section 14 selects one frame from the frame memory 13 to search the frame of the frame memory 13 to find the location P of a pixel having the maximum luminance in the frame. For example, if a luminance distribution of an input image stored in the frame corresponding to a view field formed by a horizontal angle of 50° and a vertical angle of 25° is illustrated in FIG. 13A where a center $O_O$ of a projected entire display image of the video projection system is defined, the control section 14 find a maximum luminance point P having a maximum luminance as illustrated in FIG. 13B to define an X-direction reference line $R_x$ and a Y-direction reference line $R_y$ perpendicular to each other at the maximum luminance point P.

Figure 13A:
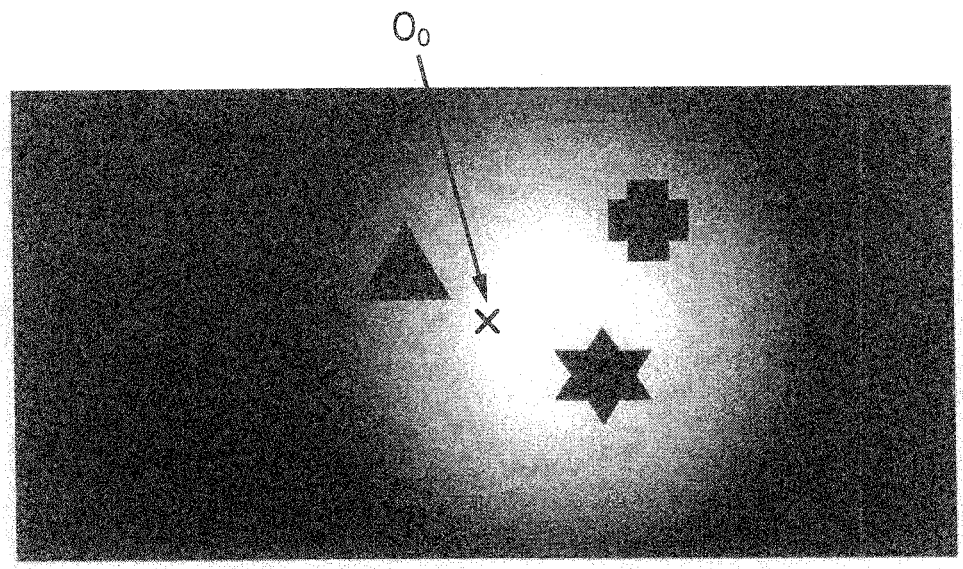
FIGS. 13A and 13B are diagrams illustrating the luminance distribution of an input image of one frame of the frame memory of FIG. 2.
Figure 13B:
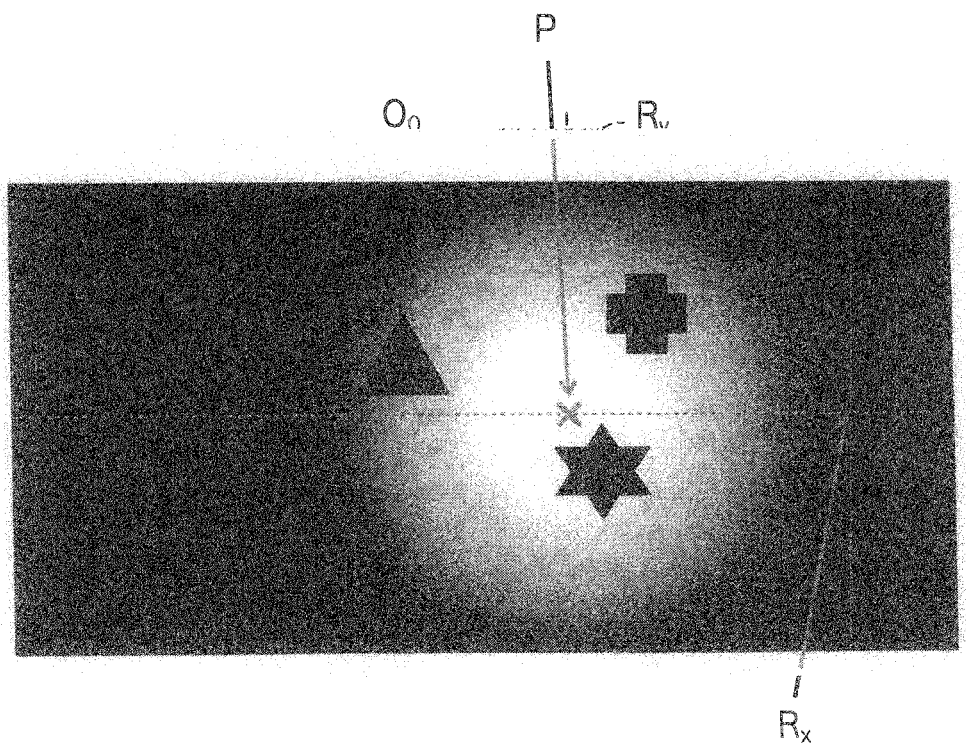

In the luminance distribution of FIGS. 13A and 13B, assume that the luminance L is monotonously decreased from the maximum luminance point P to the periphery of the luminance distribution.

Steps 1006 to 1011 are provided for generating a local video signal LVSA and offset signals $OFFA_x$ and $OFFA_y$ for the local video projection unit 2A predetermined by a horizontal angle of 16° and a vertical angle of 8'.

At step 1006, the control section 14 scans pixels of the frame of the frame memory 13 having an input luminance distribution ILD to select pixels whose luminances L satisfy:

$$LB_{max} < L \le LA_{max}$$

where $LA_{max}$ is the maximum luminance of pixels belonging to the local video projection unit 2A, and $LB_{max}$ the maximum luminance of pixels belonging to the local video projection unit 2B. For example, as illustrated in FIG. 14B, the luminance L of pixels along the X-direction reference line $R_x$ is gradually increased toward a center $O_A$, and then, is gradually decreased from the center $O_A$ not shown, note that the luminance L of pixels along the Y-direction reference line $R_y$ has a similar tendency to the luminance L of pixels along the X-direction reference line $R_x$. As a result, pixels to be output as the local video signal (first luminance distribution) LVSA indicated by a dotted line in FIG. 14B are selected to form an actual view field to be projected by the local video projection unit 2A.

Figure 14A:
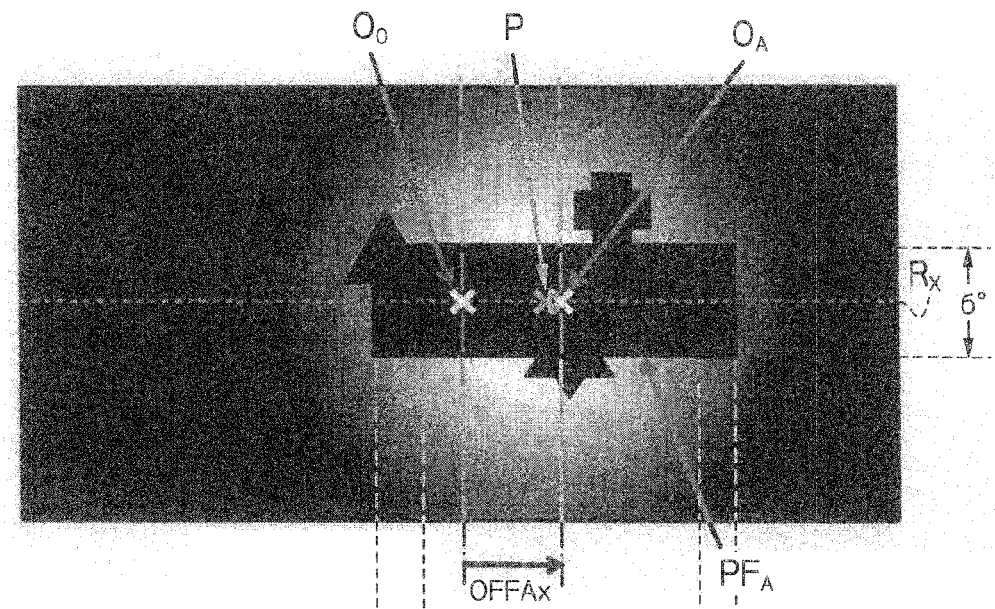
FIGS. 14A and 14B are diagrams for explaining the operation at steps 1006 to 1009 of FIG. 10.
Figure 14B:
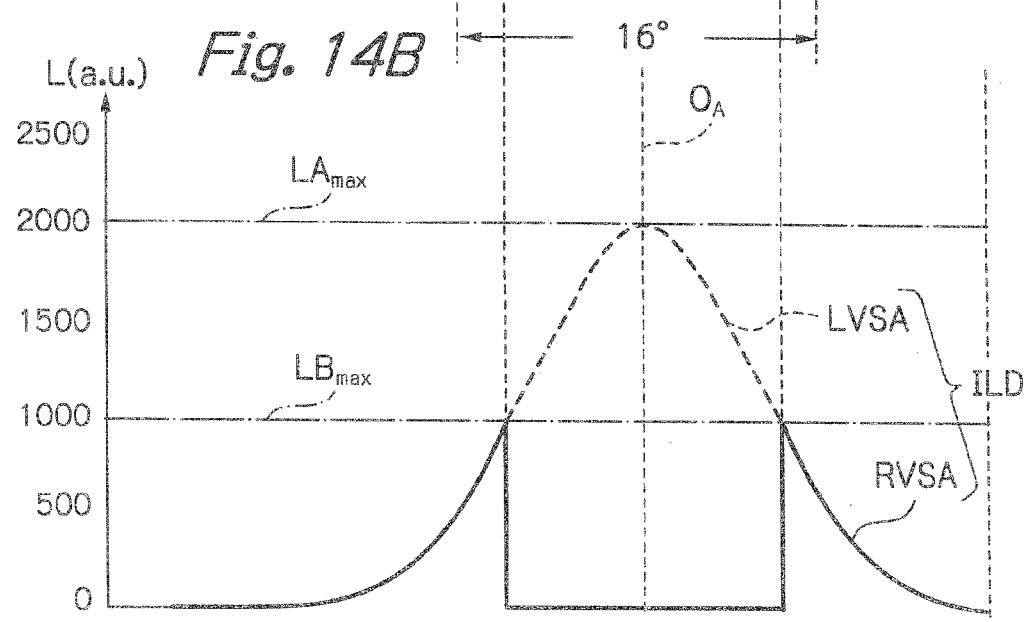

Next, referring to step 1007, it is determined whether the actual view field indicated by the dotted line in FIG. 14B is within a predetermined view field $PF_A$ formed by a horizontal angle of 16° and a vertical angle of 6° for the local video projection unit 2A as illustrated in FIG. 14A. If the determination at step 1007 is negative, the control returns to step 1005, thus scanning the next frame of the frame memory 13. In this case, after a predetermined time period, the operation at step 1005 is performed upon the next frame. Contrary to this, if the determination at step 1007 is affirmative, the control proceeds to step 1008.

At step 1008, the control section 14 calculates a center $O_A$ of the dotted line in FIG. 14B to calculate offset signals $OFFA_x$ and $OFFA_y$ determined by the difference between the center $O_A$ of the actual view field indicated by the dotted line in FIG. 14B and the center $O_O$ of the projected entire display image along the X-direction reference line $R_x$ and the Y-direction reference line $R_y$. Then, the offset signals $OFFA_x$ and $OFFA_y$ are output to the local video projection unit 2A. As a result, the local video projection unit 2A can direct its projected center towards the center $O_A$.

Figure 15:
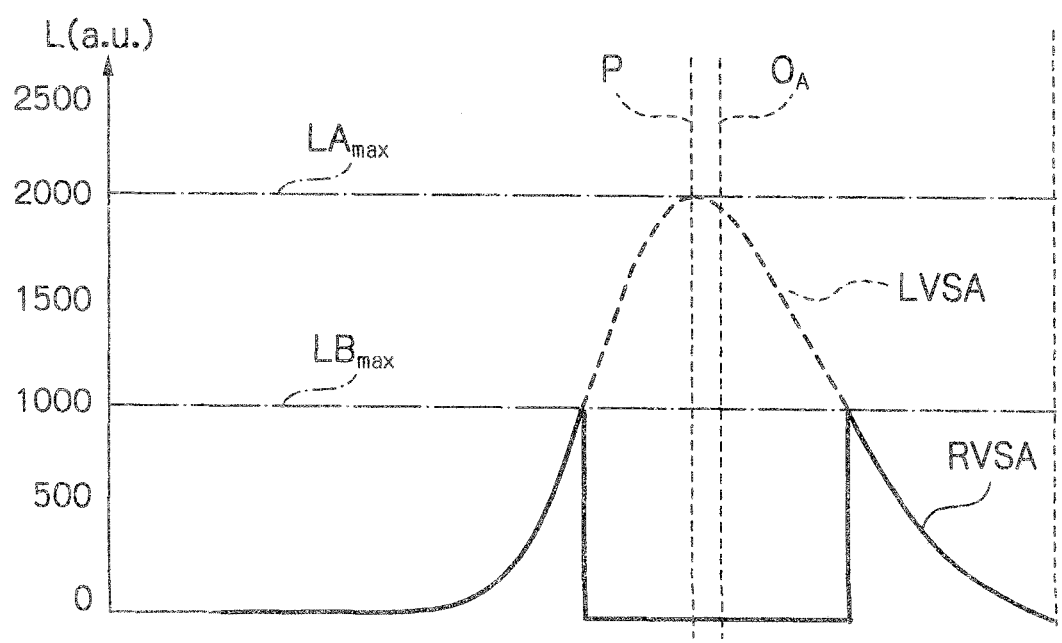
FIG. 15 is a diagram of a modification of FIG. 14B.

In FIG. 14A, note that $OFFA_y=0$. Also, generally, the center $O_A$ does not coincide with the maximum luminance point P. Particularly, when the actual view field indicated by the dotted line is asymmetrical with respect to the center $O_A$ as illustrated in FIG. 15, the center $O_A$ is deviated greatly from the maximum luminance point P.

Next, referring to step 1009, the control section 14 outputs a local video signal (first luminance distribution) LVSA based upon the actual view field indicated by the dotted line in FIG. 14B to the local video projection unit 2A. Then, the control section 14 removes pixel data of the outputted local video signal LVSA from the frame of the frame memory 13. As a result, pixel data (first remaining luminance distribution) RVSA indicated by a solid line in FIG. 14B is remained in the frame of the frame memory 13.

Steps 1010 to 1013 are provided for generating a local video signal LVSB and offset signals $OFFB_x$ and $OFFB_y$ for the local video projection unit 2B predetermined by a horizontal angle of 30° and a vertical angle of 12°.

At step 1010, the control section 14 scans pixels of the frame of the frame memory 13 to select pixels whose luminances L satisfy:

$$LC_{max} < L \le LB_{max}$$

where $LB_{max}$ is the maximum luminance of pixels belonging to the local video projection unit 2B, and $LC_{max}$ is the maximum luminance of pixels belonging to the local video projection unit 2C. As a result, pixels to be output as the local video signal (second luminance distribution) LVSB indicated by a dotted line in FIG. 16B are selected to form an actual view field to be projected by the local video projection unit 2B.

Figure 16A:
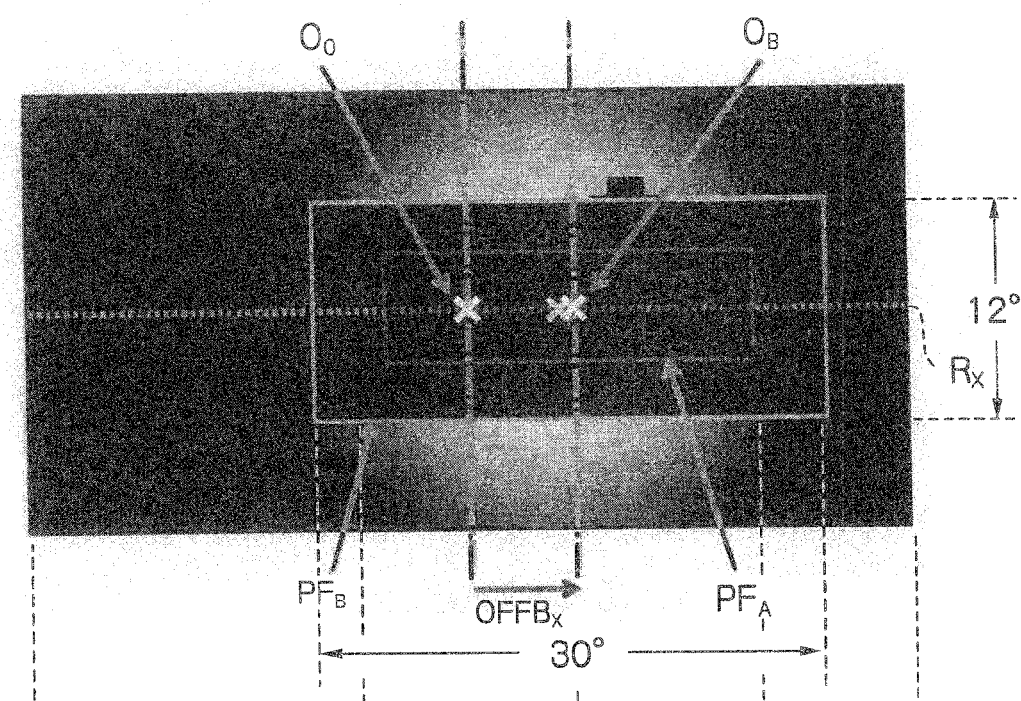
FIGS. 16A and 16B are diagrams for explaining the operation at steps 1010 to 1013 of FIG. 10.
Figure 16B:
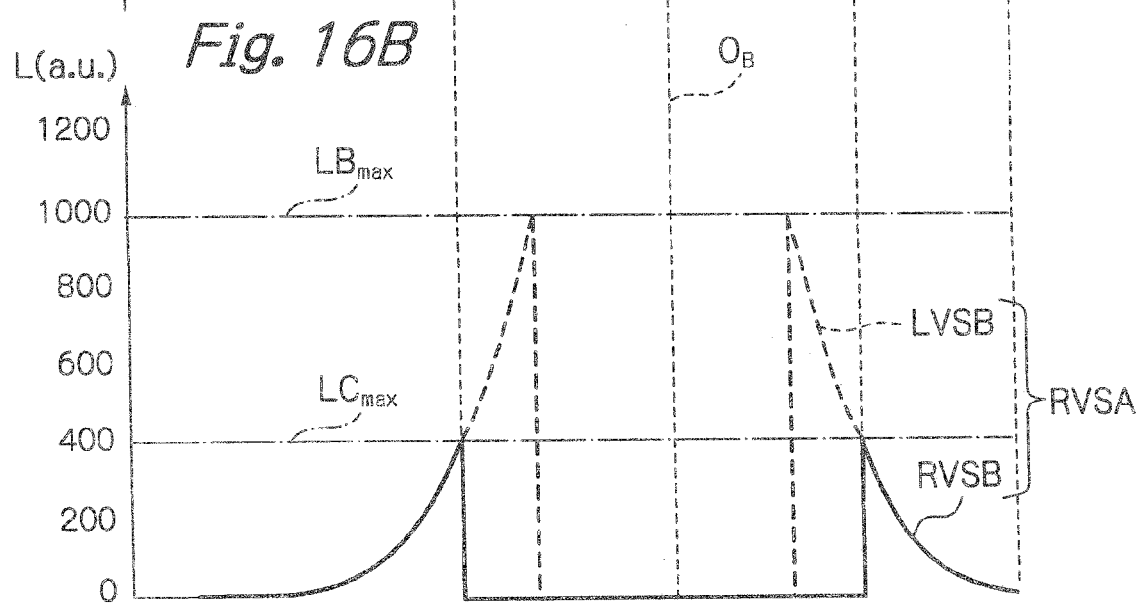

Next, referring to step 1011, it is determined whether the actual view field indicated by the dotted line in FIG. 16B is within a predetermined view field $PF_B$ formed by a horizontal angle of 30° and a vertical angle of 12° for the local video projection unit 2B as illustrated in FIG. 16A. If the determination at step 1011 is negative, the control returns to step 1005, thus scanning the next frame of the frame memory 13. In this case, after a predetermined time period, the operation at step 1005 is performed upon the next frame. Contrary to this, if the determination at step 1011 is affirmative, the control proceeds to step 1012.

At step 1012, the control section 14 calculates a center $O_B$ of the dotted line in FIG. 16B to calculate offset signals $OFFB_x$ and $OFFB_y$ determined by the difference between the center $O_B$ of the actual view field indicated by the dotted line in FIG. 16B and the center $O_O$ of the projected entire display image along the X-direction reference line R, and the) Y-direction reference line $R_y$. Then, the offset signals $OFFB_x$ and $OFFB_y$ are output to the local video projection unit 2B. As a result, the local video projection unit 2B can direct its projected center towards the center $O_B$.

Next, referring to step 1013, the control section 14 outputs a local video signal LVSB based upon the actual view field indicated by the dotted line in FIG. 16B to the local video projection unit 2B. Then, the control section 14 removes pixel data of the outputted local video signal LVSB from the frame of the frame memory 13. As a result, pixel data (second remaining luminance distribution) RVSB indicated by a solid line in FIG. 16B is retained in the frame of the frame memory 13.

Steps 1014 to 1017 are provided for generating a local video signal LVSC and offset signals $OFFC_x$ and $OFFC_y$ for the local video projection unit 2C predetermined by a horizontal angle of 40° and a vertical angle of 20°.

At step 1014, the control section 14 scans pixels of the frame of the frame memory 13 to select pixels whose luminances L satisfy:

$$LD_{max} < L \leq LC_{max}$$

where $LC_{max}$ is the maximum luminance of pixels belonging to the local video projection unit 2C, and
$LD_{max}$ the maximum luminance of pixels belonging to the local video projection unit 2D. As a result, pixels to be output as the local video signal (third luminance distribution) LVSC indicated by a dotted line in FIG. 17B are selected to form an actual view field to be projected by the local video projection unit 2C.

Figure 17A:
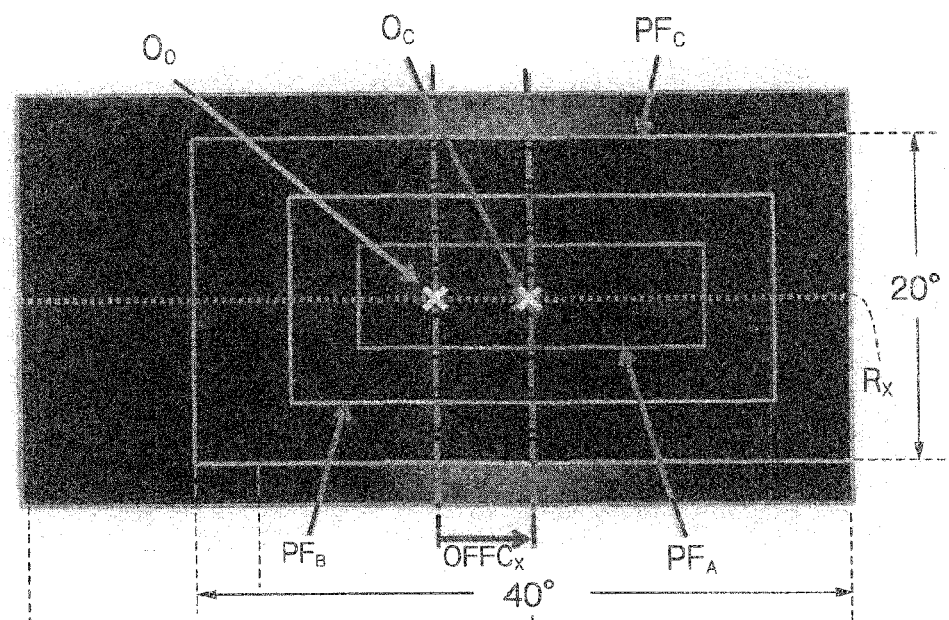
FIGS. 17A and 17B are diagrams for explaining the operation at steps 1014 to 1017 of FIG. 10.
Figure 17B:
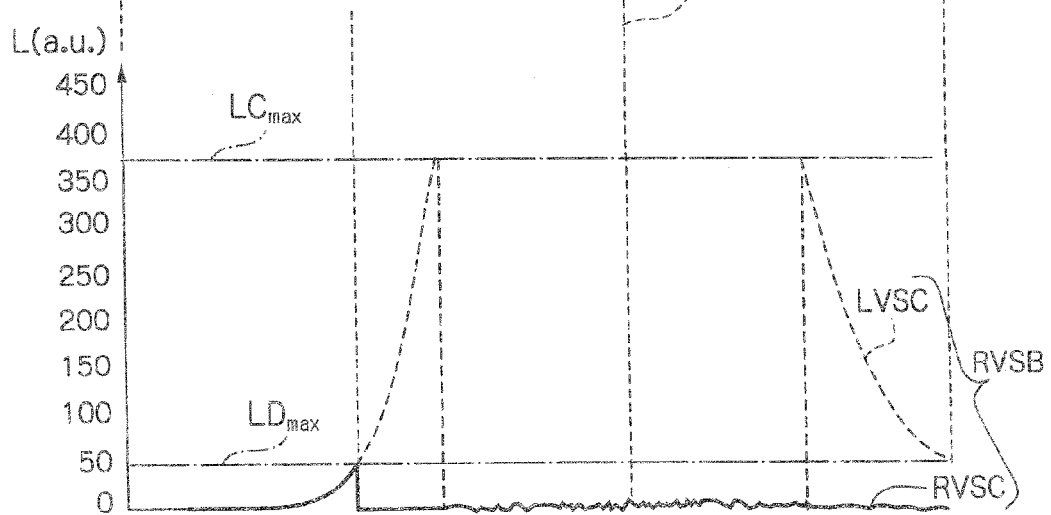

Next, referring to step 1015, it is determined whether the actual view field indicated by the dotted line in FIG. 17B is within a predetermined view field $PF_C$ formed by a horizontal angle of 40° and a vertical angle of 20° for the local video projection unit 2C as illustrated in FIG. 17A. If the determination at step 1015 is negative, the control returns to step 1005, thus scanning the next frame of the frame memory 13. In this case, after a predetermined time period, the operation at step 1005 is performed upon the next frame. Contrary to this, if the determination at step 1015 is affirmative, the control proceeds to step 1016.

At step 1016, the control section 14 calculates a center $O_C$ of the dotted line in FIG. 17B to calculate offset signals $OFFC_x$ and $OFFC_y$ determined by the difference between the center $O_C$ of the actual view field indicated by the dotted line in FIG. 17B and the center $O_O$ of the projected entire display image along the X-direction reference, line $R_x$ and the Y-direction reference line $R_y$. Then, the offset signals $OFFC_x$ and $OFFC_y$ are output to the local video projection unit 2C. As a result, the local video projection unit 2C can direct its projected center towards the center $O_C$.

Next, referring to step 1017, the control section 14 outputs a local video signal LVSC based upon the actual view field indicated by the dotted line in FIG. 17B to the local video projection unit 2C. Then, the control section 14 removes pixel data of the outputted local video signal LVSC from the frame of the frame memory 13. As a result, pixel data (third remaining luminance distribution) RVSC indicated by a solid line in FIG. 17B is retained in the frame of the frame memory 13.

Steps 1018 and 1019 are provided for generating a local video signal LVSD and offset signals $OFFD_x$ and $OFFD_y$ for the local video projection unit 20 predetermined by a horizontal angle of 50° and a vertical angle of 25°.

Figure 18A:
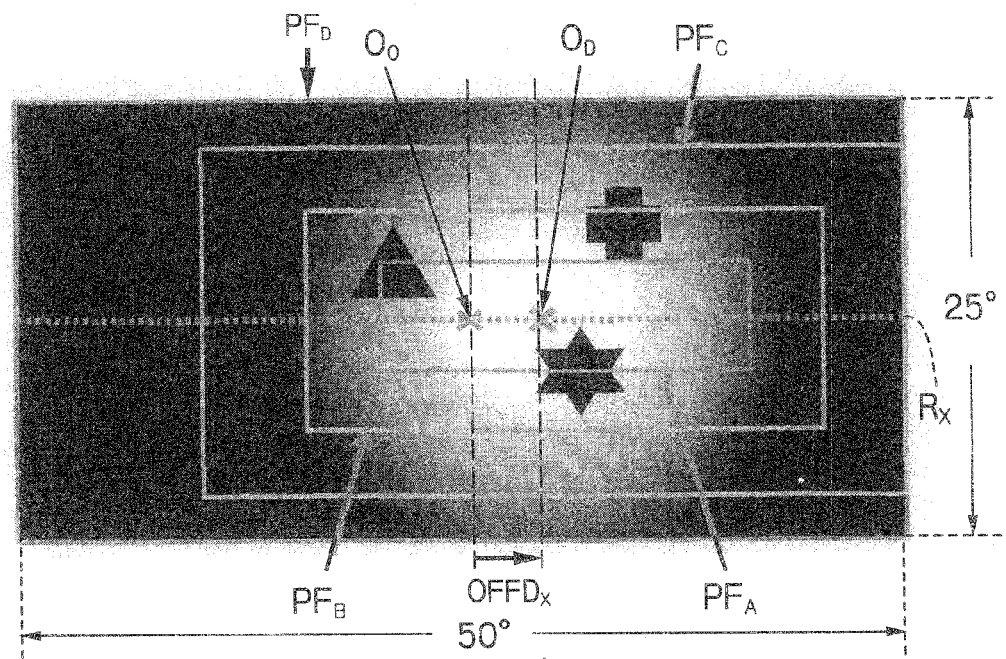
FIGS. 18A and 18B are diagrams for explaining the operation at steps 1018 and 1019 of FIG. 10.
Figure 18B:
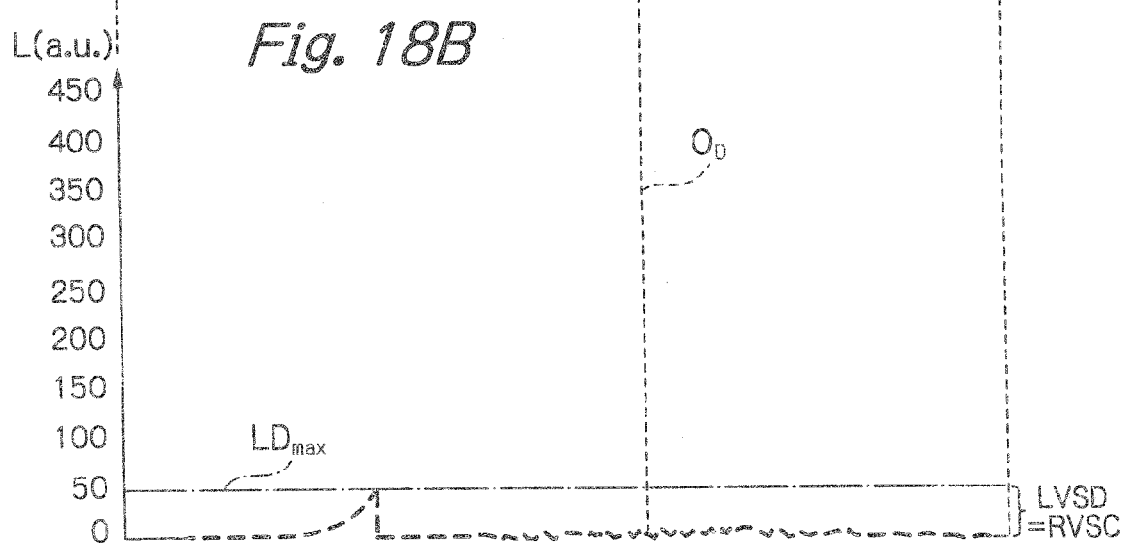

In this state, the pixel data RVSC indicated by the solid line in FIG. 18B satisfy $$0 < L \leq LD_{max}$$

where $LD_{max}$ is the maximum luminance of pixels belonging to the local video projection unit 2D. As a result, pixels to be output as the local video signal LVSD indicated by a dotted line in FIG. 18B are selected to form an actual view field to be projected by the local video projection unit 2D.

Also, the actual view field indicated by the dotted line in FIG. 18B is within a predetermined view field $PF_D$ formed by a horizontal angle of 50° and a vertical angle of 25° for the local video projection unit 2D as illustrated in FIG. 18A.

Further, the center $O_D$ of the dotted line in FIG. 18B coincides with the maximum luminance point P. Therefore, at step 1018, offset signals $OFFD_x$ and $OFFD_y$ are calculated by the difference between the center $O_D$ (=P) of the actual view field indicated by the dotted line in FIG. 18B and the center $O_O$ of the projected entire display image along the X-direction reference line $R_x$ and the Y-direction reference line $R_y$. Then, the offset signals $OFFD_x$ and $OFFD_y$ are output to the local video projection unit 2D. As a result, the local video projection unit 2D can direct its projected center towards the center $O_D$ (=P).

Next, referring to step 1019, the control section 14 outputs a local video signal (fourth luminance distribution) LVSD based upon the actual view field indicated by the dotted line in FIG. 18B to the local video projection unit 2D. Then, the control section 14 removes pixel data of the outputted local video signal LVSD from the frame of the frame memory 13. As a result, no pixel data is retained in the frame of the frame memory 13.

Then, the control returns to step 1005, thus performing the above-mentioned operations upon the next frame of the frame memory 23.

Figure 10:
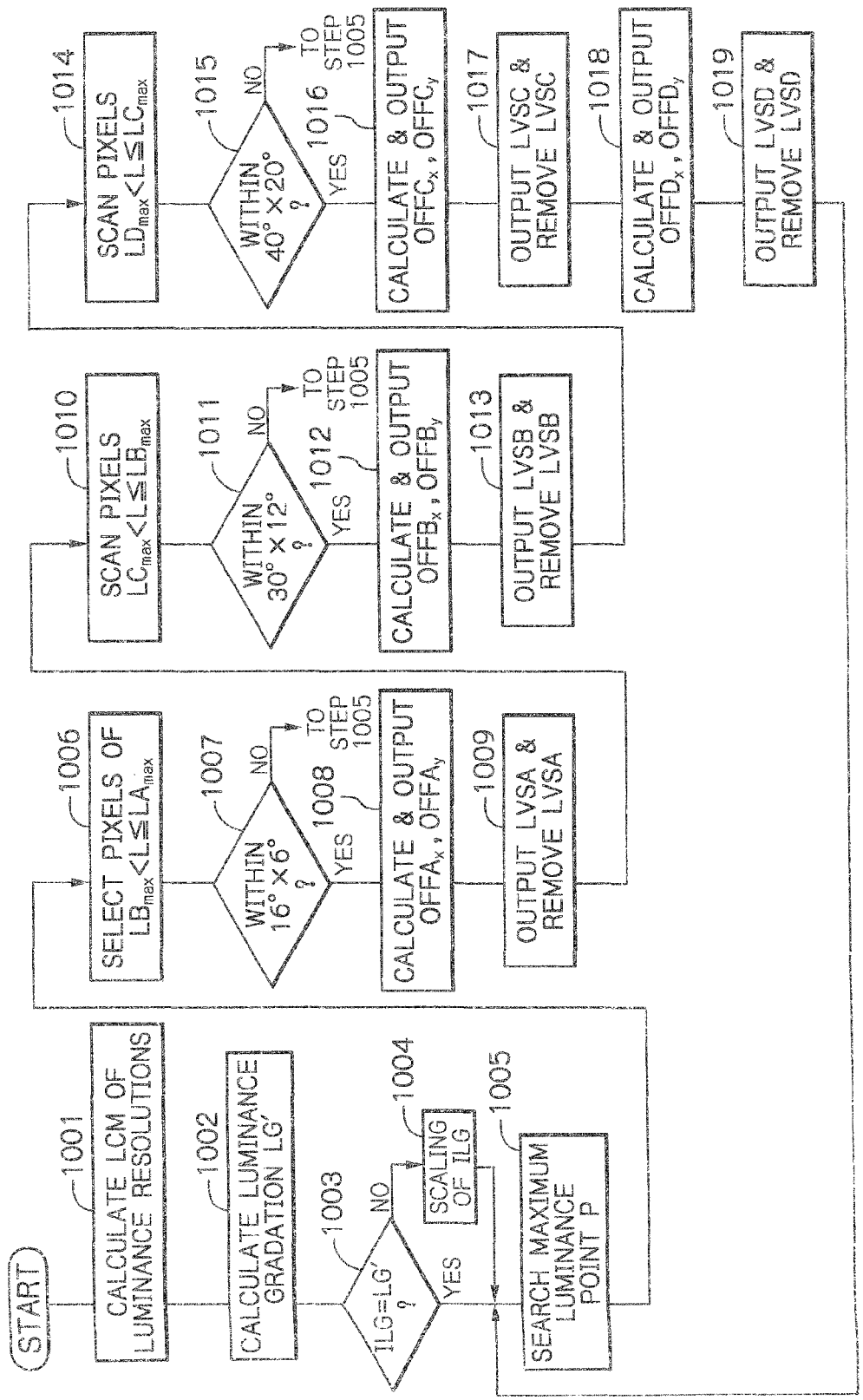
FIG. 10 is a flowchart for explaining the operation of the video signal distributing unit of FIG. 2.
Figure 19A:
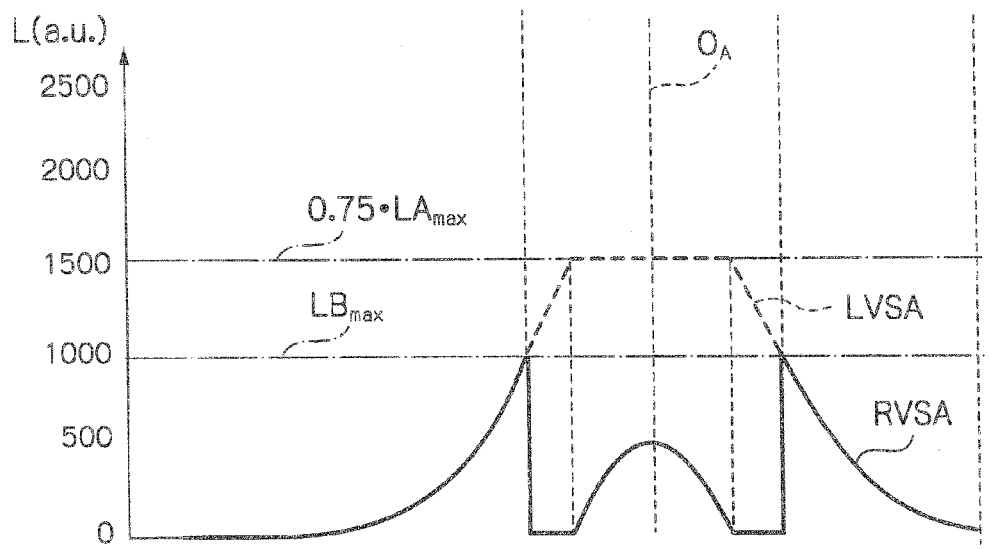
FIGS. 19A, 19B, 19C and 19D are diagrams illustrating modifications of FIGS. 14B, 16B, 17B and 18B, respectively.
Figure 19B:
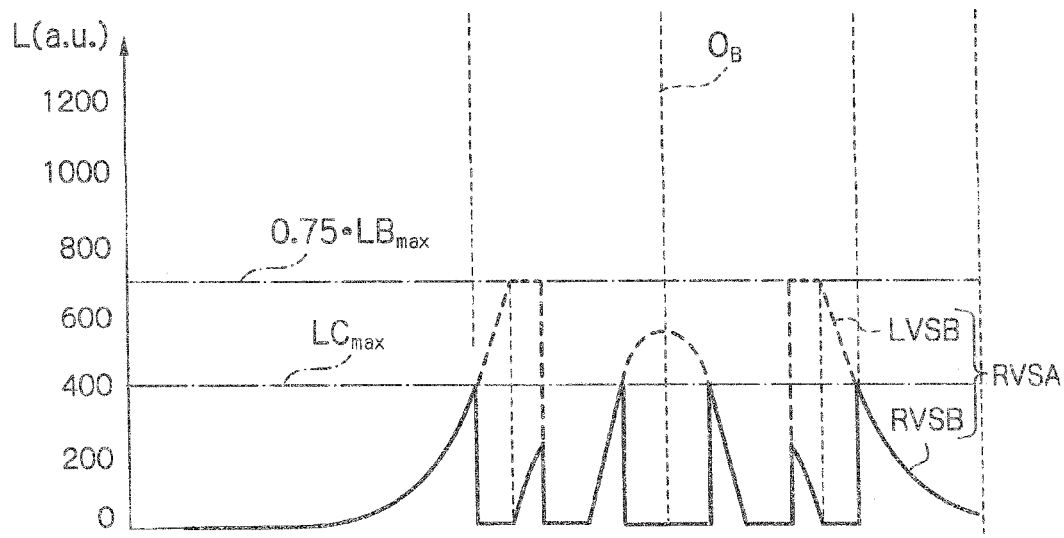
Figure 19C:
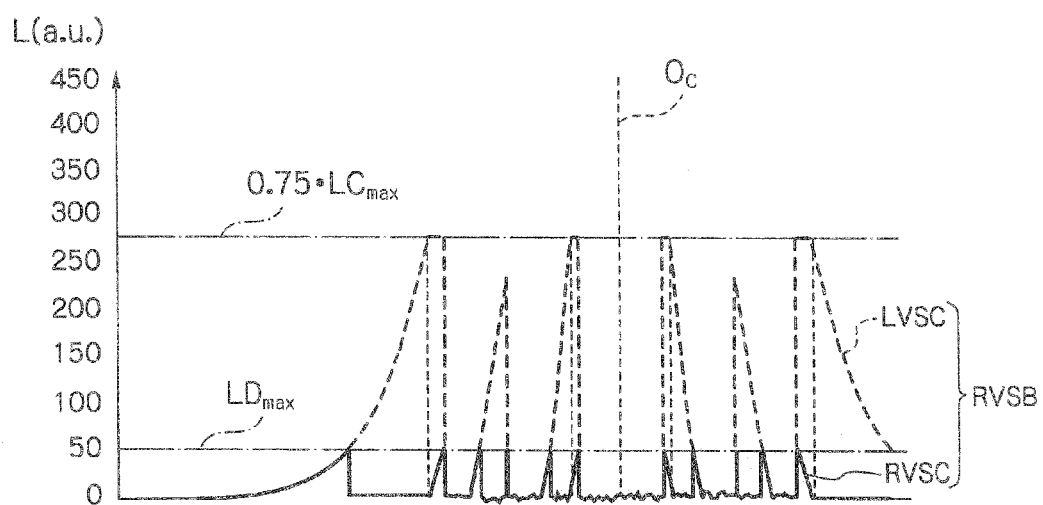

At step 1009 of FIG. 10, the pixel data having luminances L at or close to maximum luminance $LA_{max}$ as illustrated in FIG. 14B is output as the local video signal LVSA to the local video projection unit 2A; at step 1013 of FIG. 10, the pixel data having luminances L at or close to maximum luminance $LB_{max}$ as illustrated in FIG. 16B is output as the local video signal LVSB to the local video projection unit 2B; and at step 1017 of FIG. 10, the pixel data having luminances L at or close to maximum luminance $LC_{max}$ as illustrated in FIG. 17B is output as the local video signal LVSC to the local video projection unit 2C. In such a case, since the linearity (addition theorem) of the luminance L around the maximum luminance with respect to the pixel data cannot be guaranteed, the actual luminance L of the pixel data around the maximum luminance $LA_{max}$, $LB_{max}$ and $LC_{max}$ is not accurate. Therefore, at step 1009, the control section 14 can output a local, video signal LVSA having a smaller range such as $$LB_{max} < L \leq 0.75 \cdot LA_{max}$$

as indicated by a dotted line in FIG. 19A, so that pixel data RVSA indicated by a solid line in FIG. 19A is remained in the frame memory 13. Also, at step 1013, the control section 14 can output a local video signal LVSB having a smaller range such as $$LC_{max} < L \leq 0.75 \cdot LB_{max}$$

as indicated by a dotted line in FIG. 19B, so that pixel data RVSB indicated by a solid line in FIG. 19B is retained in the frame memory 13. Further, at step 1017, the control section 14 can output a local video signal LVSC having a smaller range such as $$LD_{max} < L \leq 0.75 \cdot LC_{max}$$

as indicated by a dotted line in FIG. 19C, so that pixel data RVSC indicated by a solid line in FIG. 19C is retained in the frame memory 13.

Generally, the above-mentioned three formulae are as follows:

$$LB_{max} < L \leq LB_{max} + \alpha \cdot (LA_{max} - LB_{max})$$

where $0 < \alpha < 1$;

$$LC_{max} < L \leq LC_{max} + \beta \cdot (LB_{max} - LC_{max})$$

where $0 < \beta < 1$;

$$LD_{max} < L \leq LD_{max} + \gamma \cdot (LC_{max} - LD_{max})$$

where $0 < \gamma < 1$.

In this state, the pixel data RVSC indicated by the solid line in FIG. 19C satisfy $$0 < L \leq LD_{max}$$

where $LD_{max}$ is the maximum luminance of pixels belonging to the local video projection unit 2D. As a result, pixels to be output as the local video signal LVSD indicated by a dotted line in FIG. 19D are selected to form an actual view field to be projected by the local video projection unit 2D.

Figure 19D:
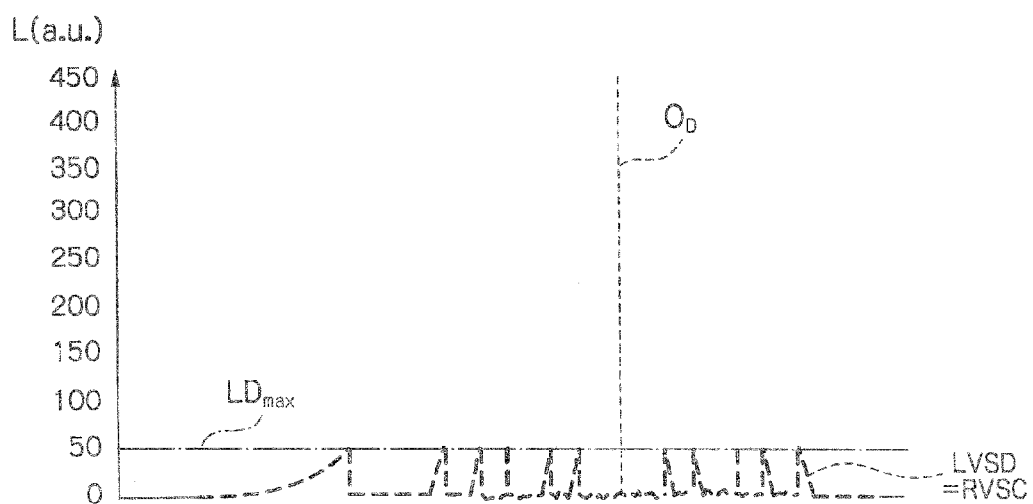

Also, the actual view field indicated by the dotted line in FIG. 19D is within a predetermined view field $PF_D$ formed by a horizontal angle of 50° and a vertical angle of 25° for the local video projection unit 2D.

Further, the center $O_D$ of the dotted line in FIG. 19D coincides with the maximum luminance point P. Therefore, at step 1018, offset signals $OFFD_x$ and $OFFD_y$ are calculated by the difference between the center $O_D$ (=P) of the actual view field indicated by the dotted line in FIG. 19D and the center $O_O$ of the projected entire display image along the X-direction reference line $R_x$ and the Y-direction reference line $R_y$. Then, the offset signals $OFFD_x$ and $OFFD_y$ are output to the local video projection unit 2D. As a result, the local video projection unit 2D can direct its projected center towards the center $O_D$ (=P).

Next, referring to step 1019, the control section 14 outputs a local video signal (fourth luminance distribution) LVSD based upon the actual view field indicated by the dotted line in FIG. 19D to the local video projection unit 20. Then, the control section 14 removes pixel data of the outputted local video signal LVSD from the frame of the frame memory 13. As a result, no pixel data is retained in the frame of the frame memory 13.

In the above-described embodiment, the MEMS optical deflector 28 can be a MEMS electromagnetic optical deflector or a MEMS electrostatic optical deflector.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A video projection system comprising:
    at least first and second local video projection units, said first local video projection unit adapted to project a first view field along with a first maximum luminance of a first luminance distribution, said second local video projection unit adapted to project a second view field larger than said first view field, along with a second maximum luminance of a second luminance distribution smaller than said first maximum luminance; and
    a video signal distributing unit adapted to distribute first and second luminance signals to said first and second local video projection units, respectively,
    a luminance resolution of said first luminance distribution being equal to a luminance resolution of said second luminance distribution.

2. The video projection system as set forth in claim 1, wherein said video signal distributing unit is adapted to select said first luminance distribution of said first luminance signal from an input luminance distribution, said first luminance distribution having luminances larger than said second maximum luminance and not larger than said first maximum luminance,
    wherein said video signal distributing unit is adapted to remove said first luminance distribution from said input luminance distribution, so that a first remaining luminance distribution remains in said input luminance distribution,
    wherein said video signal distributing unit is adapted to select said a second luminance distribution of said second luminance signal from said first remaining luminance distribution, said second luminance distribution having luminances larger than a third maximum luminance smaller than said second maximum luminance and not larger than said second maximum luminance, and
    wherein said video signal distributing unit is adapted to remove said second luminance distribution from said first remaining luminance distribution, so that a second remaining luminance distribution remains in said input luminance distribution.

3. The video projection system as set forth in claim 1, wherein said video signal distributing unit is adapted to calculate first and second centers of said first and second luminance distributions, calculate first and second offset signals showing first and second differences between said first and second centers and a center of a display image to be projected, and transmit said first and second offset signals to said first and second local video projection units.

4. The video projection system as set forth in claim 1, wherein said video signal distributing unit is adapted to remove only a part of said first luminance distribution whose luminance L satisfy:

$$LB_{max} \leq L \leq LB_{max} + \alpha \cdot (LA_{max} - LB_{max})$$

where $LA_{max}$ is said first maximum luminance;
    $LB_{max}$ is said second maximum luminance; and
    $\alpha$ is a constant between 0 and 1.

* * * * *